US 8,649,730 B2

(12) United States Patent
Yamada et al.

(10) Patent No.: US 8,649,730 B2
(45) Date of Patent: Feb. 11, 2014

(54) WIRELESS DATA TRANSPORT APPARATUS AND WIRELESS DATA TRANSPORT SYSTEM

(75) Inventors: Tsutomu Yamada, Hitachinaka (JP); Yoshihito Sato, Hitachi (JP); Hideaki Suzuki, Hitachi (JP); Shoji Suzuki, Tokyo (JP); Tatsuya Maruyama, Hitachi (JP); Junsuke Fujiwara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 12/975,402

(22) Filed: Dec. 22, 2010

(65) Prior Publication Data
US 2011/0159806 A1 Jun. 30, 2011

(30) Foreign Application Priority Data

Dec. 28, 2009 (JP) ................................. 2009-296663

(51) Int. Cl.
*H04B 3/36* (2006.01)

(52) U.S. Cl.
USPC .............. 455/7; 455/11.1; 455/445; 455/509; 455/422.1; 455/517; 370/310; 370/315; 370/328; 370/329; 370/343

(58) Field of Classification Search
USPC ........... 455/7, 11.1, 445, 412.1, 422.1, 412.2, 455/550.1, 403, 558, 500, 517, 509, 515, 455/426.1, 426.2; 370/310, 315, 328, 329, 370/343, 338
See application file for complete search history.

(56) References Cited

U.S. PATENT DOCUMENTS

| | | | |
|---|---|---|---|
| 6,097,957 A | 8/2000 | Bonta et al. | |
| 6,175,732 B1 | 1/2001 | McDaniel et al. | |
| 2003/0031155 A1* | 2/2003 | Idehara | 370/338 |

FOREIGN PATENT DOCUMENTS

| | | |
|---|---|---|
| JP | 2001-523934 | 11/2001 |
| JP | 2002-291031 | 10/2002 |
| JP | 2003-523099 | 7/2003 |
| JP | 2003-309865 | 10/2003 |
| JP | 2006-148290 | 6/2006 |
| JP | 2008-115554 | 5/2008 |
| JP | 2008-115554 | 8/2008 |
| JP | 2009-009224 | 1/2009 |
| WO | WO 2008/119948 | 10/2008 |
| WO | WO 2009/146132 | 12/2009 |

OTHER PUBLICATIONS

Patent Examination Report No. 1, issued on Nov. 16, 2012.

(Continued)

*Primary Examiner* — Keith Ferguson
(74) *Attorney, Agent, or Firm* — Antonelli, Terry, Stout & Kraus, LLP.

(57) ABSTRACT

A wireless communication system includes a wireless communication apparatus (fixed terminal) resided in a fixed station side providing a wireless antenna, a wireless communication unit, a server processing unit, a task list, a data communication unit, a buffer management unit and a buffer, and a wireless data transport apparatus (mobile terminal) resided in a mobile station side providing the wireless antenna, the wireless communication unit, a server determination unit, a task list I/O unit, the task list, a client processing unit and the buffer, thereby, the mobile terminal receives the task list from the fixed terminal to communicate data with another fixed terminal and transports not only the data but also a data acknowledgement, and the fixed terminal creates the acknowledgement to use the acknowledgement to thereby control a creation and deletion of bulk data appropriately.

14 Claims, 15 Drawing Sheets

(56) References Cited

OTHER PUBLICATIONS

Tee, et al., "Survey of Position Based Routing for Inter Vehicle Communication System", Distributed Framework and Applications, 2008. Date of Conference: Oct. 21-28, 2008.

Henkel, et al., "Delay-Tolerant Communication using Mobile Robotic Helper Nodes", Modeling and Optimization in Mobile, Ad Hoc, and Wireless Networks and Workshops, 2008. Date of Conference: Apr. 1-3, 2008.

Raymond, et al., "PGN3—Store and Forward Approach to Dynamic Networks", George Mason University, Published Nov. 14, 2009.

Leontiadis, et al., "GeOops: Mobile and Multimedia Geographical Opportunistic Routing for Vehicular Networks", World of Wireless, Networks, 2007.

JP Office Action for Japanese Patent Application No. 2009-296663, issued on Aug. 8, 2012.

* cited by examiner

FIG.5

| 70 | 71 | 72 | 73 | 74 | 75 | 76 |
|---|---|---|---|---|---|---|
| PRIORITY | DESTINATION IP | INSTRUCTION SOURCE IP | TASK | ARGUMENT | DESTINATION POSITION | INSTRUCTION SOURCE POSITION |
| 10 | 192.168.1.10 | 192.168.1.30 | NOTIFI-CATION | ACK LIST | lat1, lon1 | lat3, lon3 |
| 10 | 192.168.1.50 | 192.168.1.30 | NOTIFI-CATION | DATA | lat5, lon5 | lat3, lon3 |
| 20 | 192.168.1.10 | 192.168.1.50 | ACQUI-SITION | A001.dat | lat1, lon1 | lat5, lon5 |
| 30 | 192.168.1.10 | 192.168.1.50 | ACQUI-SITION | LATEST DATA | lat1, lon1 | lat5, lon5 |

FIG.15

| PRIORITY | DESTINATION IP | INSTRUCTION SOURCE IP | TASK | ARGUMENT | DESTINATION POSITION | INSTRUCTION SOURCE POSITION |
|---|---|---|---|---|---|---|
| 15 | 192.168.1.10 | 192.168.1.50 | NOTIFICATION | CARRIER LIST | lat1, lon1 | lat5, lon5 |

WIRELESS DATA TRANSPORT APPARATUS AND WIRELESS DATA TRANSPORT SYSTEM

BACKGROUND OF THE INVENTION

The present invention relates to an apparatus, a method and a communication system for automatically transporting bulk data between places where there is no fixed-network line, and in particularly to a wireless data transport apparatus and a transport system of the same for intermediating a transport of the bulk data and an acknowledgement between a plurality of fixed stations with which a mobile station communicates in a wireless communication.

As a result of advancing technology, it has been progressed that a reliability of industrial products is improved, a failure frequency is reduced, and a time period by the time of occurring the failure becomes long. In contrast, in a condition where various products have been spread out on a global scale in these days, a time period by the time of specifying a failure place and of procuring parts to be used for a repair becomes also long when the failure occurs once. Consequently, a manager for the products has paid attention to find the failure soon.

In the past, the manager for the products has picked up an operation condition of the products and signs of the failure to then build up a system for notifying operation information of the products by using a wireless technique, such as a cellular phone, a satellite communication channel, etc.

In the case of places where there is no fixed network line, JP-A-2008-115554 discloses a system of transporting data by using the wireless communication.

A wireless communication system disclosed in the JP-A-2008-115554 provides a wireless communication device installed on a mining heavy machinery, a transport heavy machinery and an unloading area. The transport heavy machinery travels back and forth between the mining heavy machinery and the unloading area for transporting ores. The transport heavy machinery transports the ores, and also receives and stores mining operation information from the mining heavy machinery by using the wireless communication device. Thereafter, the transport heavy machinery arrives at the unloading area to then transmit the stored mining operation information by the wireless.

The transport heavy machinery requests a transmission of mining information to the mining heavy machinery by manual or automatic. In the manual, an operator of the transport heavy machinery recognizes the mining heavy machinery to enter an ID indicating the mining heavy machinery, which is disclosed in the JP-A-2008-115554. In the automatic, the operator of transport heavy machinery depresses a predetermined button to request a reply from the mining heavy machinery resided around the operator and the mining heavy machinery from which a strongest received field strength is replied is recognized as a communication partner, which is also disclosed therein.

As mentioned above, the wireless communication system in the JP-A-2008-115554 intermediates the transport heavy machinery between a mining site and the unloading area to send the mining operation information.

Further, JP-A-2006-148290 discloses a vehicle information collecting system for simply and steadily collecting vehicle information from vehicles traveling freely in a wide workplace in low cost.

In the vehicle information collecting system in the JP-A-2006-148290, a terminal device collects the vehicle information of between a plurality of vehicles and the terminal device by using a wireless LAN. The terminal device performs a broadcast transmission toward the vehicles to request a vehicle ID by using the wireless LAN. The vehicle transmits the own vehicle ID to the terminal device by the wireless LAN. The terminal device receives the vehicle ID to discriminate a target vehicle from which the information is acquired and perform a unicast transmission to request the vehicle information for the target vehicle from which the information is acquired by the wireless LAN.

When a target product is expensive and an availability ratio of the product is significantly effect on benefit and trust of the operator, it is important that the product failure should be previously predicted for economics and trust of enterprises. Consequently, a preventive maintenance technique has been paid attention to detect a failure sign.

For performing the preventive maintenance, a status indicating whether the product is normal or abnormal is notified and the operation information indicating a temperature inside the product and an operation time period is also notified, which is, however, sometimes insufficient. For a purpose of realizing the preventive maintenance, it is required that a control message inside the product to be targeted to the preventive maintenance and various pieces of sensor information to be used in the control are notified to a manager side. To this end, data amount to be notified becomes enormous, or it sometimes becomes several hundred megabytes (MB, mega is the 6th power of 10) per day as an example.

As mentioned above, an example to be notified the product data to the manager side has been existing, in the case of between the places where there is no fixed network line and between the products. A wireless network, such as a satellite network, cellular phone, etc. cannot be used for sending the bulk data due to the economic reason, it is therefore required to have a system of automatically retrieving data by making use of a self-administered wireless, such as wireless LAN. However, there are two points as large problem in the above-mentioned technique so that the bulk data extended to the several hundred MB per day is transmitted.

As a first problem, it cannot be performed that an appropriate product to be targeted to the preventive maintenance (for example, the wireless communication device of mining heavy machinery in JP-A-2008-115554) is mutually and automatically recognized with an appropriate mediator (for example, the wireless terminal device of transport heavy machinery in JP-A-2006-148290) to then transmit and receive necessary data one another, in the above-mentioned systems. Therefore, it is required that the communication partner is recognized frequently and efficiently with one another to transmit and receive the necessary data automatically so that the mediator receives the bulk data from the product.

However, in the JP-A-2006-148290, an operation requires that whether the operator selects the communication partner by manual or the operator resided around the mining heavy machinery depresses a button so that the communication partner is recognized. It is also required that the vehicle information as an instruction is given to the terminal device in advance, in the JP-A-2006-148290.

Further, it is required that a retransmission request corresponding to a data loss is received and data is also received from a number of the mediators so that the mediator receives the bulk data from the product to notify it to the manager side. However, there is no disclosure related to a data flow control in the JP-A-2008-115554 and JP-A-2006-148290.

A second problem of transmitting the bulk data is that a storage volume of product data becomes large, but there is no disclosure of a system for appropriately controlling a time period during which data is stored. For this reason, a data storage area for the product becomes excessive to therefore increase a cost. Or, a data storage area for the product becomes too small, therefore, there arises a problem that data is lost before communicating data necessary for the product.

SUMMARY OF THE INVENTION

In light of the above-mentioned problem, the invention provides to automatically and mutually recognize an appropriate communication partner to be able to efficiently communicate the bulk data with between the places where there is no fixed network line and between the product and the manager so that the bulk data is transported automatically.

An object of the invention is to provide a wireless data transport apparatus and a wireless data transport system for intermediating a data retransmission and acknowledgement between the product and manager so that the data storage area for the product is managed appropriately.

In order to achieve the above-mentioned object, according to a first aspect of the invention, a wireless communication system executes a data communication between a plurality of wireless communication apparatuses via a wireless relay transport apparatus, the wireless relay transport apparatus. The wireless communication apparatus comprises: a client wireless communication unit that executes a transmission and reception of data to and from the plurality of wireless communication apparatuses via a wireless communication; a server determination unit that selects a communication target from among the plurality of wireless communication apparatuses; a client task list to be written with the plurality of wireless communication apparatuses to be the communication target and process contents to be communicated; and a client processing unit that executes an indication of the communication target in accordance with the client task list to execute a communication of the data and a data acknowledgement, wherein the server determination unit has a timer and selects the wireless communication apparatus communicable for a predetermined time interval in a predetermined wireless received signal strength.

The server determination unit provides a positioning unit that outputs position information of the wireless relay transport apparatus itself, the client task list provides the position information of the wireless communication apparatus, and the server determination unit selects the wireless communication apparatus resided in a nearest position from the wireless relay transport apparatus itself from among the wireless communication apparatuses communicable for the predetermined time interval in the predetermined wireless received signal strength.

The wireless relay transport apparatus further comprises a task list I/O unit to receive an input task list written with a task to be updated, from an outside terminal, the task list I/O unit has a function that determines the outside terminal that inputs the input task list and updates a part of the task list by using the input task list, and the client processing unit updates the input task list via the task list I/O unit.

According to a second aspect of the invention, a wireless communication system executes a data communication between a plurality of wireless communication apparatuses via a wireless relay transport apparatus. The wireless communication apparatus comprises: a server wireless communication unit that executes a transmission and reception of data from a plurality of wireless relay transport apparatuses via a wireless communication; a server processing unit that executes a process in accordance with a request from the plurality of wireless relay transport apparatuses; and a server task list to be written with the plurality of wireless communication apparatuses and process contents to be communicated, wherein the server processing unit receives the data and outputs a data acknowledgement corresponding to the data from and to the wireless relay transport apparatuses to receive and output the server task list.

According to a third aspect of the invention, a wireless communication system executes a data communication between a plurality of wireless communication apparatuses via a wireless relay transport apparatus. The wireless communication system is configured by at least two wireless communication apparatuses and at least one wireless relay transport apparatus, and the wireless relay transport apparatus comprises: a client wireless communication unit that executes a transmission and reception of data to and from the wireless communication apparatus via a wireless communication; a server determination unit that selects a communication target from among the plurality of wireless communication apparatuses; a client task list to be written with the plurality of wireless communication apparatuses and process contents to be communicated; and a client processing unit that executes an indication of a communication target in accordance with the written client task list to execute a communication of the data and a data acknowledgement, wherein the server determination unit has a timer and selects the wireless communication apparatus communicable for a predetermined time interval in a predetermined wireless received signal strength. The wireless communication apparatus comprises: a server wireless communication unit that executes the transmission and reception of the data to and from a plurality of wireless relay transport apparatuses via the wireless communication; a server processing unit that executes a process in accordance with a request from the plurality of wireless relay transport apparatuses; and a server task list to be written with the plurality of wireless communication apparatuses and process contents to be communicated, wherein the server processing unit receives the data and outputs a data acknowledgement corresponding to the data from and to the wireless relay transport apparatuses to receive and output the server task list.

The wireless relay transport apparatus has a task list I/O unit to receive an input task list written with a task to be updated from an outside terminal, the task list I/O unit has a function that determines the outside terminal that receives the input task list to update a part of the client task list by using the input task list, and the client processing unit updates the client task list via the task list I/O unit.

The wireless communication apparatus has a data communication unit, a buffer management unit and a server buffer, the data communication unit has an interface that executes to receive and output the data from and to outside terminals of the wireless communication apparatus, the server buffer stores the data to be received and outputted from and to the data communication unit, the buffer management unit has a flow control unit, and the flow control unit provides a function that manages a breakout and a loss of the data stored in the server buffer and a function that adds a task for retransmitting lost data to the server task list when detecting the data loss.

The wireless relay transport apparatus provides a client buffer, and the client processing unit transmits the data to the wireless communication apparatus to correspond a data acknowledgement from the wireless communication apparatus to the data, store in the client buffer as an acknowledgment list and output the acknowledgement list to another wireless communication apparatus.

According to a fourth aspect of the invention, a wireless communication system executes a data communication between a plurality of wireless communication apparatuses via a wireless relay transport apparatus in a place where there is no direct communication path. The wireless communication system comprises: a server wireless communication unit that executes a transmission and a reception of data to and from a plurality of wireless relay transport apparatuses via a wireless communication; a server processing unit that executes a process in accordance with a request from the plurality of wireless relay transport apparatuses; a server task list written to be with the plurality of wireless communication apparatuses and process contents to be communicated; and a carrier list written with the wireless relay transport apparatus to be used for a data transport, wherein the server processing unit receives the data and outputs a data acknowledgement corresponding to the data from and to the wireless relay transport apparatuses to receive and output the server task list and to receive the carrier list, and the server processing unit does not transmit the data for a data request from the wireless relay transport apparatus unwritten in the carrier list.

In order to achieve the above-mentioned object, according to fifth aspect of the invention, a wireless communication system executes a data communication between a plurality of wireless communication apparatuses via a wireless relay transport apparatus in a place where there is no direct communication path. The wireless communication system is configured by at least two wireless communication apparatuses and at least one wireless relay transport apparatus, the wireless relay transport apparatus comprises: a client wireless communication unit that executes a transmission and reception of data to and from the wireless communication apparatus via a wireless communication; a server determination unit that selects a communication target from among the plurality of wireless communication apparatuses; a client task list to be written with the plurality of wireless communication apparatuses and process contents to be communicated; and a client processing unit that executes an indication of the communication target in accordance with the written client task list to execute a communication of the data and a data acknowledgement, the server determination unit has a timer and selects the wireless communication apparatus communicable for a predetermined time interval in a predetermined wireless received signal strength. The wireless communication apparatus comprises: a server wireless communication unit that executes the transmission and reception of the data to and from the plurality of wireless relay transport apparatuses via the wireless communication; a server processing unit that executes a process in accordance with a request from the plurality of wireless relay transport apparatus; a server task list to be written with the plurality of wireless communication apparatuses and process contents to be communicated; and a carrier list written with the wireless relay transport apparatus to be used for a data transport, wherein the server processing unit receives the data and outputs a data acknowledgement corresponding to the data from and to the wireless relay transport apparatuses to receive and output the server task list and to receive the carrier list, and the server processing unit does not transmit the data for a data request from the wireless relay transport apparatus unwritten in the carrier list.

According to the invention, a data communication is realized without operating by human, such as maintenance people and operators when performing the data communication and control information communication between the wireless communication apparatuses. In consequence, there is no operation error caused by manual, such as to forget depressing a switch or mistake a selection, therefore, the data communication can be made reliable. Further, it is unnecessary to secure personnel necessary for a skill, such as maintenance workers, therefore, globally available devices can be a target for collecting data.

For example, it is possible to realize the preventive maintenance for various devices, as an application. Further, the wireless data transport apparatus in the invention moves between a plurality of wireless communication apparatuses to thereby intermediate a delivery and a receipt of data and data acknowledgement (ACK) one another.

In consequence, the wireless communication apparatus confirms a data delivery to then be able to delete the data, therefore, it is not required that a memory capacity is prepared excessively to store the data, so that it is possible to build up the wireless communication apparatus in an appropriate cost. Further, the delivery is confirmed to then delete the data, so that a steady data communication can be executed without data loss between the wireless communication apparatuses.

According to the invention, a plurality of wireless data transport apparatuses are provided for collecting data automatically and data is transported in parallel to the plurality of wireless data transport apparatuses, so that the data communication can be executed in high reliability, even under an environment where all of the wireless data transport apparatuses are not arrived at the wireless communication apparatus.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing a configuration example of a task list in the wireless data transport apparatus in the first embodiment of the invention;

FIG. 15 is a diagram showing a configuration example of the task list in the wireless data transport apparatus in the second embodiment of the invention.

DETAILED DESCRIPTION OF THE INVENTION

The invention relates to an apparatus and a communication system of automatically transporting bulk data between places where there is no fixed network line. First, a communication system using a wireless data transport apparatus in the invention will be described. A configuration of the wireless data transport apparatus in the invention and its wireless communication system will then be described.

In addition, in the invention applicable to a utilization field, it is preferred that the invention is applied to transporting data between the places where there is no fixed network line. For example, for a purpose of a preventive maintenance for devices, such as pumps, compressors, etc. in a plant, the invention is applicable to a patrol on which a maintenance worker takes a wireless terminal to walk around between the devices and a monitoring room.

Further, in an ore mining site of a mine, the invention is also applicable to transporting data together with ores loaded on a dump truck mounting with the wireless terminal to be communicated with between a power shovel and an unloading area or the monitoring room, for the purpose of performing the preventive maintenance of power shovel.

Besides mentioned above, the invention is also applicable to an automobile, ship, airplane, etc., for transporting data and e-mail to the places and islands where an Internet is not available.

The following embodiment will be described with an example applicable to the mine, but also applicable to an entire application of transporting data between the places where there is no above-mentioned network line.

First Embodiment

Figure 1:
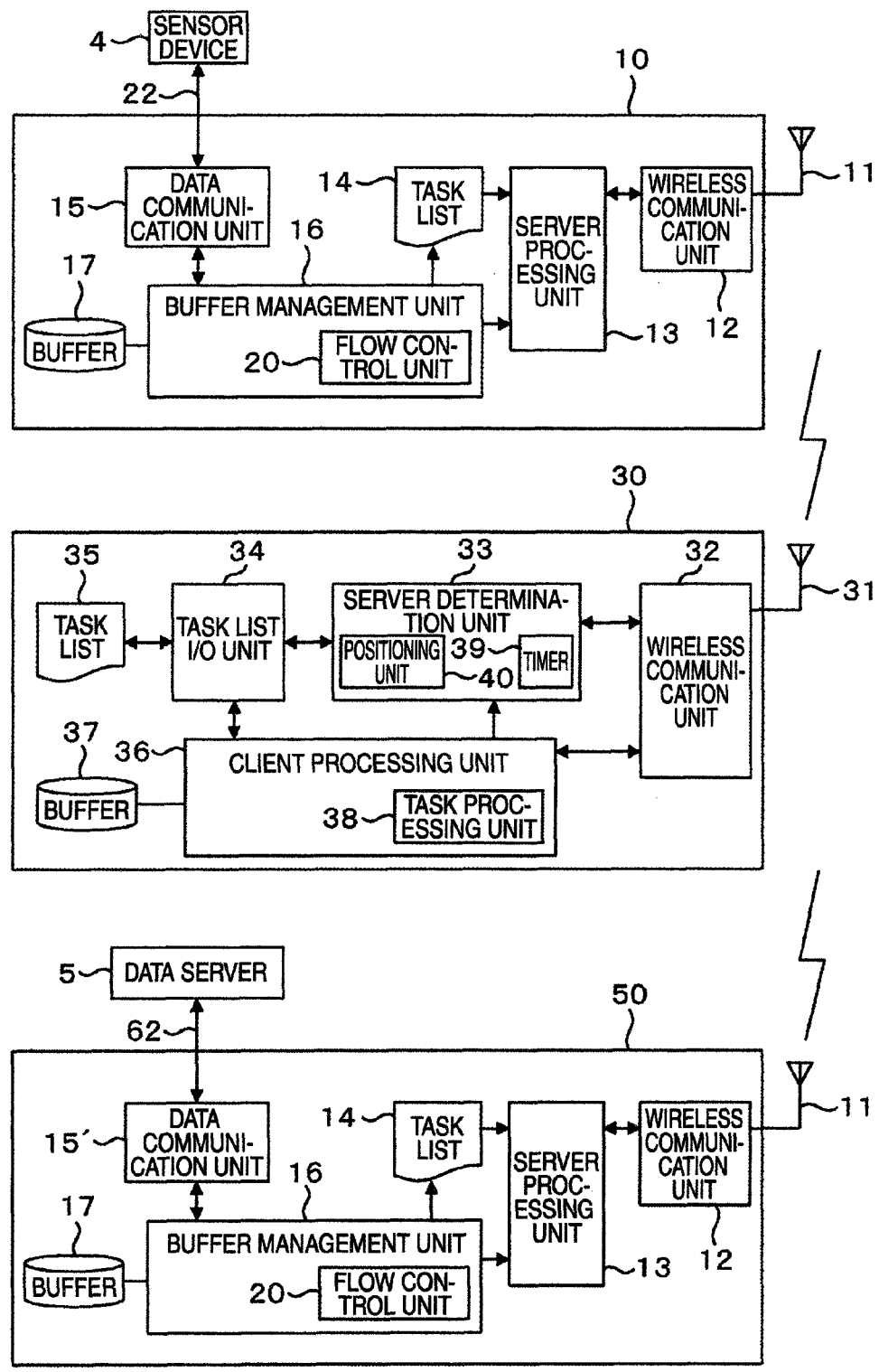
FIG. 1 is an outline diagram showing a communication system applied with a wireless data transport apparatus in a first embodiment of the invention.

FIG. 1 shows a general outline of a communication system using a wireless data transport apparatus in a first embodiment of the invention.

A configuration of the communication system will be described with reference to FIG. 1. The communication system in the invention is configured by wireless communication apparatuses 10, 50, a wireless data transport apparatus 30, a sensor device 4 and a data server 5.

Specifically, the wireless communication apparatuses 10, 50 are a device operated as a server for supplying data and a task to the wireless data transport apparatus 30 and providing services in accordance with a request from the wireless data transport apparatus 30.

In contrast, the wireless data transport apparatus 30 receives the data and task, as an instruction, from the wireless communication apparatuses 10, 50 to operate as a client in accordance with the instruction. An operation of these apparatuses will be described later.

The sensor device 4 is a device for collecting information from a target to be measured, on which the wireless communication apparatus 10 is installed. For example, the sensor device 4 collects a measured result of physical values, such as a temperature, humidity, pressure, oscillation, voltage, current, etc. at the various portions of measured target. The sensor device 4 notifies the collected result to the wireless communication apparatus 10 via a communication path 22.

The data server 5 is a computer for receiving and storing data received by the wireless communication apparatus 50 via a communication path 62. The data server 5 can be replaced with various devices, including a general-purpose computer such as a personal computer etc., hard disk device, NAS (Network Attached Storage) device, controller, monitoring device, etc.

In relation to the communication paths 22, 62, the invention has an uninhibited configuration even in the types of communication path. The communication path in the embodiment of the invention can employ a wire communication path, such as Ethernet (registered trademark) specified by IEEE 802.3, a USB specified by IEEE 1394, a CAN (Controller Area Network) specified by EIA-232/422/485, etc., and a wireless communication path, such as a wireless LAN specified by and compliant with IEEE 802.11, a sensor network specified by and compliant with IEEE 802.15.4, a wireless communication path such as a low power wireless, etc. This embodiment will be described with a configuration example employing the Ethernet as the communication paths 22, 62.

The embodiment of the invention does not limit the type of wireless to be used in wireless communication units 12, 32. For example, they can use wireless communication means, such as the wireless LAN specified by and compliant with IEEE 802.11, sensor network specified by and compliant with IEEE 802.15.4, a WiMAX specified by and compliant with IEEE 802.16, the low power wireless, a cellular phone packet network, etc.

The wireless communication apparatuses 10, 50 can be the same configuration, that is, configured by a wireless antenna 11, the wireless communication unit 12, a server processing unit 13, a task list 14, data communication units 15, 15', a buffer management unit 16 and a buffer 17. Further, the buffer management unit 16 incorporates a flow control unit 20. The data communication units 15, 15' incorporate an appropriate interface depending on the communication paths 22, 62. Hereinafter, the data communication units 15, 15' are referred to as data communication unit 15 unless otherwise specified.

The wireless communication unit 12 has a function to notify the data received from the wireless antenna 11 to the server processing unit 13 and transmit the data notified from the server processing unit 13 from the wireless antenna 11. The server processing unit 13 stores the data received from the wireless communication unit 12 in the buffer 17 or task list 14 via the buffer management unit 16. Further, the server processing unit 13 notifies the data stored in the task list 14 to the wireless communication unit 12. The data communication unit 15 communicates with the sensor device 4 or data server 5 via the communication paths 22, 62. For the data used in the communication of the data communication unit 15, the data communication unit 15 executes storing the data in the buffer 17 and acquiring the data from it via the buffer management unit 16.

The wireless data transport apparatus 30 includes a wireless antenna 31, the wireless communication unit 32, a server determination unit 33, a task list I/O unit 34, a task list 35, a client processing unit 36 and a buffer 37. The client processing unit 36 incorporates a task processing unit 38. Further, the server determination unit 33 incorporates a timer 39 and a positioning unit 40.

The wireless communication unit 32 notifies data received from the wireless antenna 31 to the client processing unit 36 to output the data from the wireless antenna 31 in accordance with a control from the client processing unit 36 and server determination unit 33.

The client processing unit 36 stores a part of the data received from the wireless communication unit 32 in the buffer 37. The client processing unit 36 also stores the part of data received from the wireless communication unit 32 in the task list 35 via the task list I/O unit 34. The client processing unit 36 communicates with the wireless communication unit 32 and server determination unit 33 to process task contents contained in the task list 35. The task contents include a data acquisition from a specified device and a data delivery and also a control information delivery. An operation of the task list 35 and client processing unit 36 will be described in detail later.

The server determination unit 33 controls the wireless communication unit 32 to search and determine the wireless communication device (server) as a target for a communication in accordance with a specified communication target contained in the task list 35. The server determination unit 33 determines whether the communication is started with the communication target by using the timer 39 and positioning unit 40, when determining the communication target. A method for the determination will be described in detail later.

Figure 2:
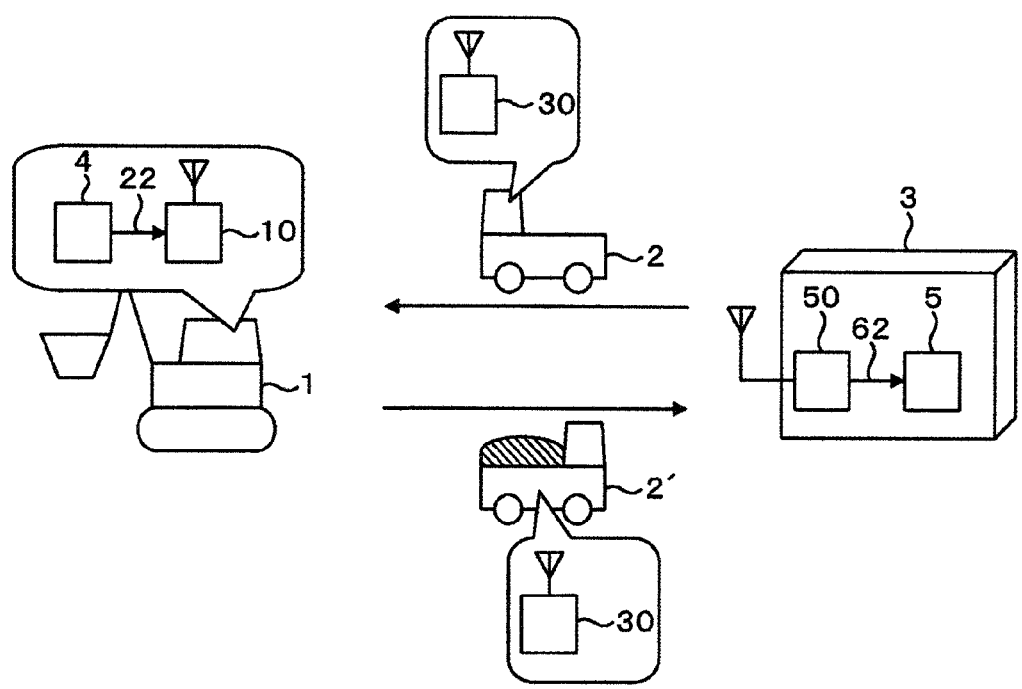
FIG. 2 is a diagram schematically showing an example of the system applied with the wireless data transport apparatus and to an ore mining site in the first embodiment of the invention.

FIG. 2 is a schematic diagram showing the ore mining site and shows an example of the communication system using the wireless data transport apparatus in the first embodiment of the invention.

FIG. 2 also shows a condition where a dump truck 2 travels back and forth between a shovel 1 and an administration building 3. The shovel 1 is placed in the ore mining site to be operated distantly from the administration building 3.

In addition, a dump truck 2' shows conveniently a condition where the dump truck 2 loads the ore. Hereinafter, the dump trucks 2, 2' are referred to as dump truck 2 as a whole unless otherwise specified.

The wireless communication apparatus 10 is connected with the sensor device 4 via the communication path 22 to be equipped on the shovel 1. The sensor device 4 is wired and installed on the shovel 1 so as to acquire operation information thereof. Further, the wireless data transport apparatus 30 is mounted on the dump truck 2. The wireless communication apparatus 50 is connected with the data server 5 via the communication path 62, which is installed in the administration building 3.

In addition, FIG. 2 schematically shows the apparatuses and devices so as to be fixed in housings and places, which is however not limited thereto. For example, the wireless communication apparatus 50 may be installed outside the administration building 3 so as to easily communicate with the wireless data transport apparatus 30, and the wireless communication device 12 alone may be extended by another communication means to install outside the administration building 3.

The operation information and various communication records become bulk data, such as several hundred MB per day, on the operation of shovel 1. The bulk data is transported from the shovel 1 to the administration building 3 to then execute a process of the data. In consequence, an application, such as the preventive maintenance etc. can be realized, for example.

The dump truck 2 in the invention transports not only the data but also a data acknowledgement (ACK). It is therefore possible to appropriately control a generation and deletion of the bulk data by generating the ACK from the wireless communication apparatus 50, transporting the ACK by the wireless data transport apparatus 30, and receiving and recognizing the ACK by the wireless communication apparatus 10. Further, a reliable data transmission can be executed by a delivery confirmation, so that the invention is applicable to a high reliable application.

In FIG. 2, the shovel 1, dump truck 2 and administration building 3 are indicated as one unit for each, but the invention is applicable to any cases, without limiting to the number of units. That is, a plural number of dump trucks arrive at a plural number of shovels, respectively, and the respective pieces of data can be delivered to a plural number of administration buildings, respectively.

The ore mining site has been described as an applicable example, which is not limited to the above-mentioned example. For example, it is considered that a maintenance worker moves between a control instrument and a manager room in a factory. The invention is applicable to a configuration where the sensor device 4 and wireless communication apparatus 10 are mounted on the control instrument, and the data server 5 and wireless communication apparatus 50 are installed in the administration building 3. In this way, the maintenance worker has the wireless data transport apparatus 30 to then move between the control instrument and manager room.

In another applicable example, there is a case that an electronic mail and electronic data are delivered between the places where there is no network line. It is considered that a mobile object, such as an automobile, bicycle, ship, airplane, etc. delivers the data between a delivery source and a delivery destination for the electronic data, such as electronic mail. In this case, the wireless communication apparatuses 10 and 50 are installed respectively on the delivery source and the delivery destination, and the wireless data transport apparatus 30 is mounted on the mobile object. The electronic data is therefore sent out from the delivery source, and the mobile object transports the electronic data to the delivery destination. Thereafter, the mobile object receives the ACK from the delivery destination to then notify the ACK to the delivery source.

Figure 3:
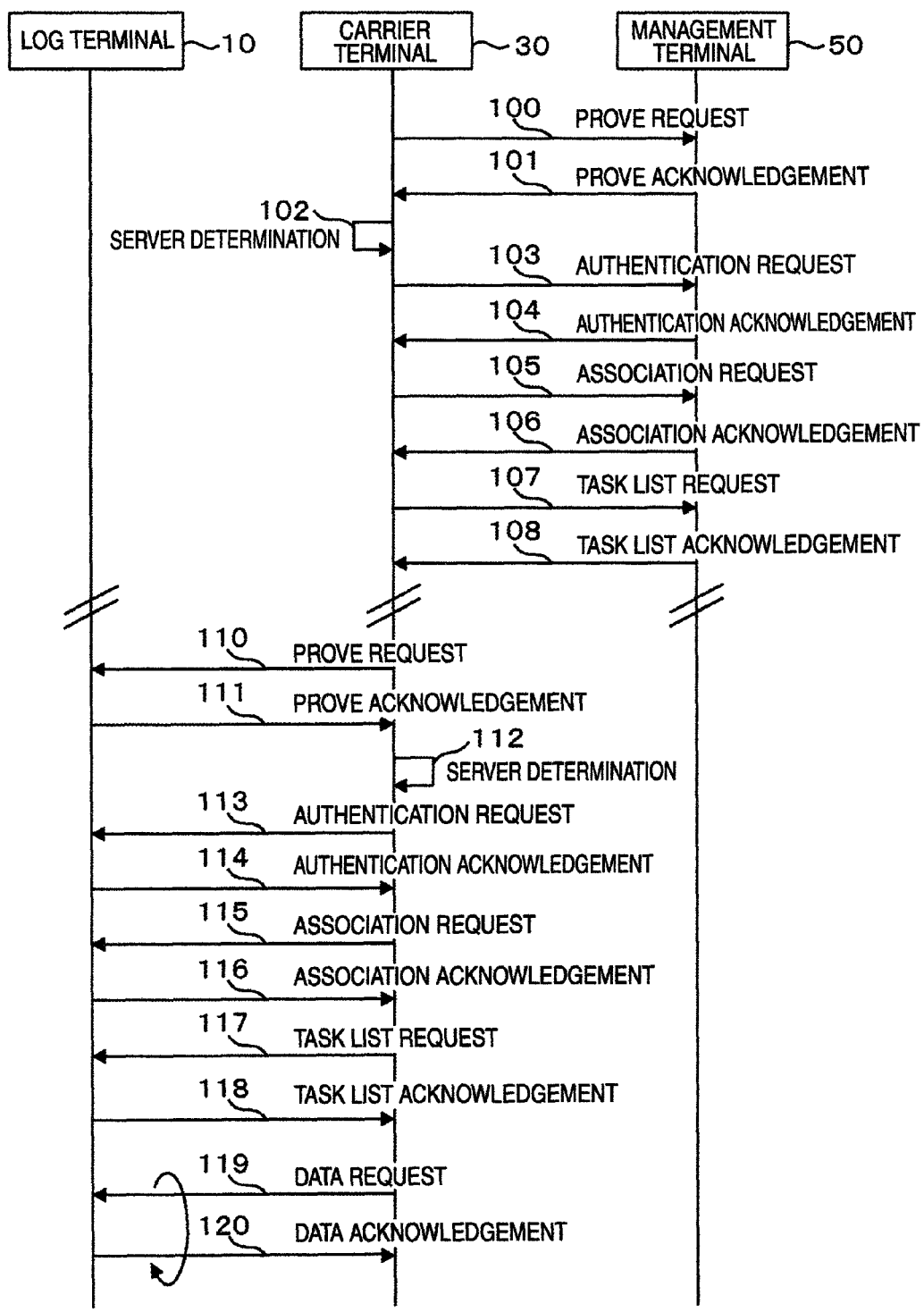
FIG. 3 is a sequence diagram showing an initial operation for communicating data and control information between wireless apparatuses in the first embodiment of the invention.

As mentioned above, the invention is widely applicable to a configuration where there is no fixed network line between the delivery source and delivery destination of the data and the mobile object exists between them, particularly to an application required for delivering the bulk data in high reliability. FIG. 3 is a sequence diagram showing a part of an operation for communicating the data and control information between the wireless communication apparatuses in the first embodiment of the invention, particularly for initially communicating the data and control information.

Hereinafter, a description will be concerned conveniently with the following alteration naming, that is, the wireless communication apparatus 10 mounted on the shovel 1 is replaced with a log terminal 10, the wireless data transport apparatus 30 mounted on the dump truck 2 is replaced with a carrier terminal 30, and the wireless communication apparatus 50 installed in the administration building 3 is replaced with a management terminal 50.

The operation will be described with reference to FIG. 3. In addition, the wireless LAN specified by and compliant with IEEE 802.11 is dealt with as a wireless system for use in the wireless communication units 12, 32 in this embodiment. A communication flow will be described with use of terminologies related to the wireless LAN, however, the invention is not limited thereto. The invention is applicable by appropriately assigning the process flow in FIG. 3 to a function of the wireless specification to be used.

In addition, a unique SSID (Service Set Identifier) as an identifier of the wireless LAN is set commonly between the terminals in advance.

The carrier terminal 30 issues a prove request appended with the unique SSID, for determining whether a communication partner resides around a periphery, at a process 100. The carrier terminal 30 repeats the process 100 by the time of acquiring a prove acknowledgement. The management terminal 50 replies the prove acknowledgement when it recognizes that the SSID assigned to own oneself is consistent with the SSID contained in the prove request, at a process 101. The above-mentioned operation is called as an "active scanning" in the wireless LAN.

Thereafter, the server determination unit 33 in the carrier terminal 30 detects the existence of management terminal 50 from the received prove acknowledgement to then confirm, from the timer 39 and positioning unit 40, that it can be communicated with the desirable management terminal 50, at a process 102.

The carrier terminal 30 issues an authentication request to the management terminal 50 so that it is authenticated to have a qualification for connecting to a network, at a process 103.

The management terminal 50 executes an authentication process as required, in consequence, it issues an authentication acknowledgement when authenticating the connection with the requested terminal, at a process 104. Here, it is possible to use a common key authentication, an open system authentication, etc. as an authentication method. The common key authentication is an authentication system using a challenge-response system, and the open system authentication is for permitting all.

The carrier terminal 30 issues an association request to be connected in wireless with the desirable management terminal 50, after completing the authentication process, at a process 105.

Thereafter, the management terminal 50 confirms that the carrier terminal 30 is authenticated to then issue the association acknowledgement, at a process 106.

The management terminal 50 may execute an 802.1X authentication after the association acknowledgement, for authenticating the terminal strictly. After setting up the association, the carrier terminal 30 issues a task list request to the management terminal 50 so that the terminal knows a process to be executed, at a process 107.

The management terminal 50 selects a task list corresponding to the carrier terminal 30 to issue a task list acknowledgement to the carrier terminal 30, at a process 108.

At this time point, the process of carrier terminal 30 is terminated since the process to be executed to the management terminal 50 is not written in the task list.

It is assumed that the task list received by the carrier terminal 30 is written in such that the carrier terminal 30 is connected with the log terminal 10 to then acquire the data. Thereafter, the carrier terminal 30 again issues the prove request to then repeat the process of determining, whether the log terminal 10 is connected, from the acquired prove acknowledgement by the server determination unit 33.

For this time period, it is assumed that the carrier terminal 30 moves to then enter an area in which it can be communicated with the log terminal 10.

The carrier terminal 30 issues the prove request appended with the unique SSID so that it determines whether the log terminal 10 is resided around a periphery, at a process 110.

The carrier terminal 30 repeats the process 110 by the time of acquiring the prove acknowledgement. The log terminal 10 replies the prove acknowledgement when the SSID assigned to the own oneself is consistent with the SSID contained in the prove request, at process 111.

Thereafter, the server determination unit 33 in the carrier terminal 30 detects the existence of log terminal 10 from the received prove acknowledgement to confirm that it can be communicated with the desirable log terminal 10 from the timer 39 and positioning unit 40, at a process 112.

The carrier terminal 30 issues the authentication request to the log terminal 10 so that it is authenticated to have the qualification for connecting to the network, at a process 113.

The log terminal 10 executes the authentication process as required, in consequence, it issues the authentication acknowledgement when authenticating the connection with the requested terminal, at a process 114.

Here, it is possible to use the common key authentication and open system authentication, similarly to the above mentioned description.

The carrier terminal 30 issues an association request to be connected in wireless with the desirable log terminal 10, after completing the authentication process, at a process 115.

Thereafter, the log terminal 10 confirms that the carrier terminal 30 is authenticated to then issue an association acknowledgement, at a process 116.

Here, the process for authenticating the terminal strictly is the same as mentioned above.

After setting up the association, the carrier terminal 30 issues the task list request to the log terminal 10 so that the terminal knows a process to be executed, at a process 117.

The log terminal 10 selects a task list corresponding to the carrier terminal 30 to issue the task list acknowledgement to the carrier terminal 30, at a process 118.

Here, it is assumed that the task list specifies the carrier terminal 30 so as to acquire the data from the log terminal 10 together with a data identifier. The carrier terminal 30 requests the data to the log terminal 10 on the basis of the data identifier, at a process 119.

The log terminal 10 acknowledges the corresponding data to the carrier terminal 30, at a process 120. The carrier terminal 30 repeats the processes 119 and 120 as long as there is data to be acquired. For this time period, the carrier terminal 30 builds up a list of the received data in the own buffer 37.

For a time period during which the data is acquired, it is possibly happened that the dump truck 2 mounted with the carrier terminal 30 travels while all pieces of data are not received yet. In this case, the carrier terminal 30 holds the list of data completely received in normal. The carrier terminal 30 then issues again the prove request set together with a predetermined SSID to repeat finding out a connection partner.

Figure 4:
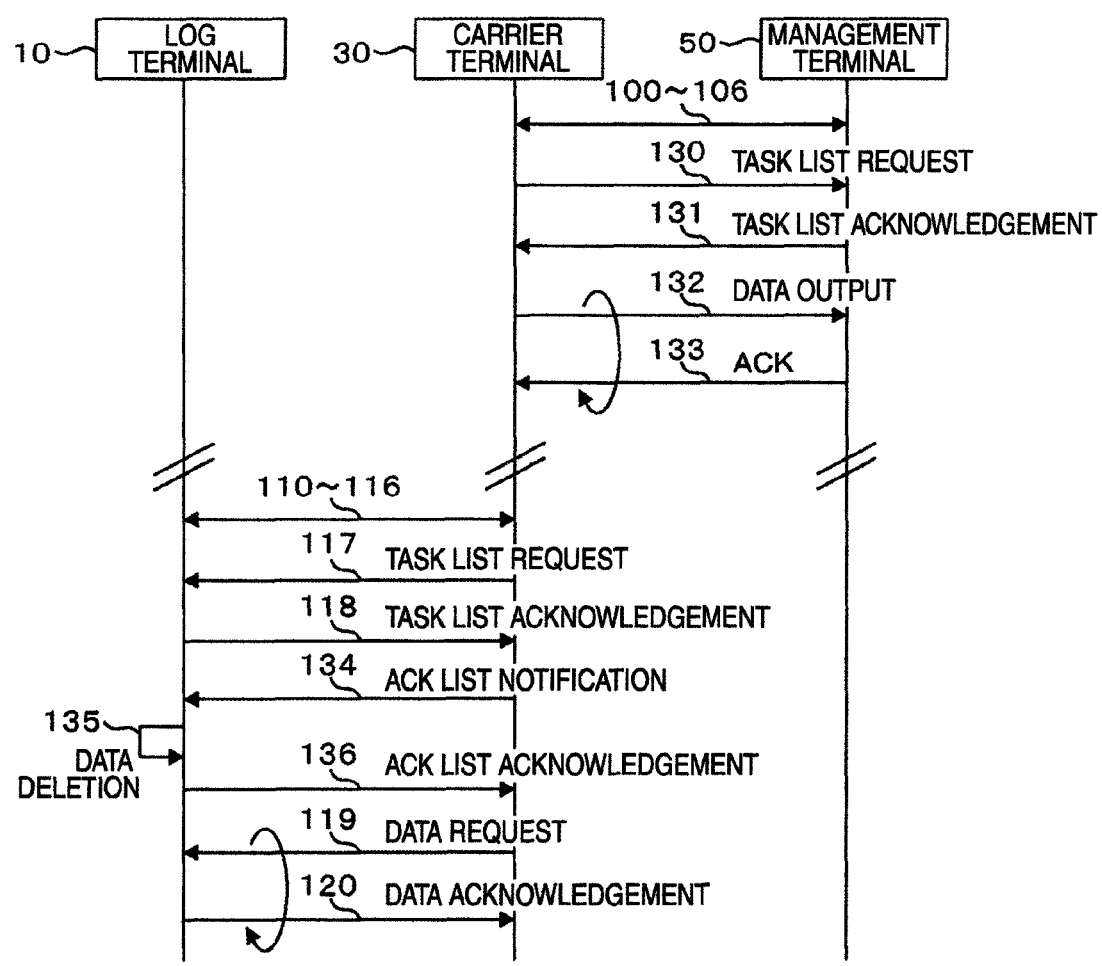
FIG. 4 is a sequence diagram showing on and after second operation for communicating the data and control information between the wireless apparatuses in the first embodiment of the invention.

FIG. 4 is a sequence diagram showing a part of the operation to communicate the data and control information between the wireless apparatuses in the first embodiment of the invention, particularly communicate the data and control information on and after the second time. The following description will be concerned with reference to FIG. 4.

First, the carrier terminal 30 issues the prove request by the time of finding a communication partner.

At this time, the carrier terminal 30 refers to the task list 35 in response to the wireless apparatus resided in the communicable area to execute a listed process. In this embodiment, an example where the carrier terminal 30 enters the communicable area of the management terminal 50 will be described, after the process in FIG. 3.

After the carrier terminal 30 enters the communicable area of management terminal 50, the carrier terminal 30 and management terminal 50 execute the same connection process as shown in FIG. 3, at the processes 100 to 106.

The carrier terminal 30 acquired the association acknowledgement issues the task list request to the management terminal 50, at a process 130.

The management terminal 50 acknowledges a task for outputting received data together with the task list to the carrier terminal 30, at a process 131.

The carrier terminal 30 received the task list analyzes the contents of task list to output the data received by the own oneself from the log terminal 10 to the management terminal 50, at a process 132.

The management terminal 50 received the data notifies the acknowledgement (ACK) corresponding to the received data to the carrier terminal 30, at a process 133.

The carrier terminal 30 creates a list of the ACK to then store in the buffer 37.

The carrier terminal 30 repeats the processes 132 to 133 as long as there is data to be received from the log terminal 10.

Thereafter, it is assumed that the dump truck 2 mounted with the carrier terminal 30 travels and enters again the communicable area of the log terminal 10. The carrier terminal 30 recognizes the log terminal 10 to execute the connection process for executing the process written in the task list, at the processes 110 to 116.

After setting up the association, the carrier terminal 30 issues the task list request to the log terminal 10 to know the process to be executed by the terminal, at the process 117.

The log terminal 10 selects the task list corresponding to the carrier terminal 30 to issue the task list acknowledgement to the carrier terminal 30, at the process 118.

Thereafter, the carrier terminal 30 notifies the ACK list held in the own buffer 37 to the log terminal 10, at a process 134.

The log terminal 10 recognizes that the corresponding data is delivered to the management terminal 50 in response to the ACK written in the ACK list. The log terminal 10 then deletes the corresponding data held by the own oneself, at a process 135.

The log terminal 10, which terminated the deletion, replies the acknowledgement of ACK list to the carrier terminal 30, at a process 136. Here, it is assumed that the task list specifies the carrier terminal 30 so as to acquire the data from the log terminal 10, together with the data identifier. The carrier terminal 30 requests the data to the log terminal 10 on the basis of the data identifier, at the process 119.

The log terminal 10 acknowledges the corresponding data to the carrier terminal 30, at the process 120.

The carrier terminal 30 repeats the processes 119 and 120 as long as there is data to be acquired. For this time period, the carrier terminal 30 builds up the list of received data in the own buffer 37.

In this way, the carrier terminal 30 moves between the log terminal 10 and management terminal 50 to thereby intermediate a delivery and reception, one another, of the data and data acknowledgement (ACK).

In consequence, the log terminal 10 confirms the data delivery to be able to delete the data. Therefore, it is not required that a memory capacity is prepared excessively to store the data, so that it is possible to build up the log terminal 10 in an appropriate cost.

Further, the delivery is confirmed to then delete the data, so that a steady data communication can be executed between the log terminal 10 and management terminal 50 without data loss.

Furthermore, according to the invention, the plurality of carrier terminals 30 are provided for collecting the data automatically and even under an environment where all of the carrier terminals 30 are not reached to the management terminal 50, the data communication can be executed in high reliability. In consequence, it is possible to prepare a number of carrier terminals 30 for receiving the data automatically, so that a problem does not arise for the data delivery process. This will be described an embodiment later, and this above-mentioned configuration is an operative technique for a data parallel transmission.

FIG. 5 shows a configuration example of the task list 35 in the wireless data transport apparatus in the first embodiment of the invention.

The task list 35 in the carrier terminal 30 is configured as a table having a priority 70, a destination IP address 71, an instruction source IP address 72, a task 73, an argument 74, a destination position 75 and an instruction source position 76. Further, FIG. 5 shows a table, as an example, having tuples 80 to 83, that is, each of the tuples corresponds to one task (process unit).

In addition, this embodiment will be described of the case where the IP address of log terminal 10 is 192.168.1.10, the IP address of carrier terminal 30 is 192.168.1.30 and the IP address of management terminal 50 is 192.168.1.50.

The priority 70 indicates an execution order of the task, in relation to the task, the destination IP address 71 of which is the same. For example, the tuples 80, 82 and 83 indicate the destination IP address 192.168.1.10, however, indicate that the priority or execution order represents the tuples 80, 82 and 83 in order.

The destination IP address 71 indicates an IP address of a targeted device executed the task.

The instruction source IP address 72 indicates an IP address of a device issued the task.

The instruction IP address 72 is required for an update of the task list, as described later.

The task 73 indicates processing contents to be executed by a holder of the task list. Further, the argument 74 indicates a target of the process of the task 73.

The contents of task 73 includes executing a "notification" or an "acquisition" of the contents of argument 74 etc.

The destination position 75 and instruction source position 76 indicate information related to a physical position of the respective apparatuses, and are used when the after-mentioned server determination unit 33 determines a relation between an apparatus to be targeted and a position for the own oneself. The information written in the instruction source position 76 may be information understandable for the relation to the position of carrier terminal 30. In this embodiment, the information related to a latitude and a longitude acquirable from GPS (Global Positioning System) is written in the destination position 75 and instruction source position 76, specifically, represented by "lat" (Latitude) and "lon" (Longitude). These pieces of information may be prepared by the apparatus for generating the task list in advance or acquired from a targeted apparatus. This embodiment will be described with use of the former manner.

The following description will be concerned with the contents of task list 35 in FIG. 5.

The tuple 80 means that a process of "notifying" the "ACK list" to the "log terminal 10" is executed in response to an instruction from the "carrier terminal 30" in the priority "10". Likewise, the tuple 81 means that a process of "notifying" the "data" (if it is present) to the "management terminal 50" is executed in response to the instruction from the "carrier terminal 30" in the priority "10". The tuple 82 means that a process of "acquiring" data called as "A001.dat" for the "log terminal 10" is executed in response to the instruction from the "management terminal 50" in the priority "20". The tuple 83 means that a process of "acquiring" the "latest data"

among the pieces of data not acquired by the carrier terminal 30 yet, for the "log terminal 10", is executed in response to the instruction from the "management terminal 50" in the priority "30".

In this way, the client processing unit 36 and server determination unit 33 refer to the contents of task list 35 to be able to execute an operation of a flexible data communication by the carrier terminal 30.

Figure 6:
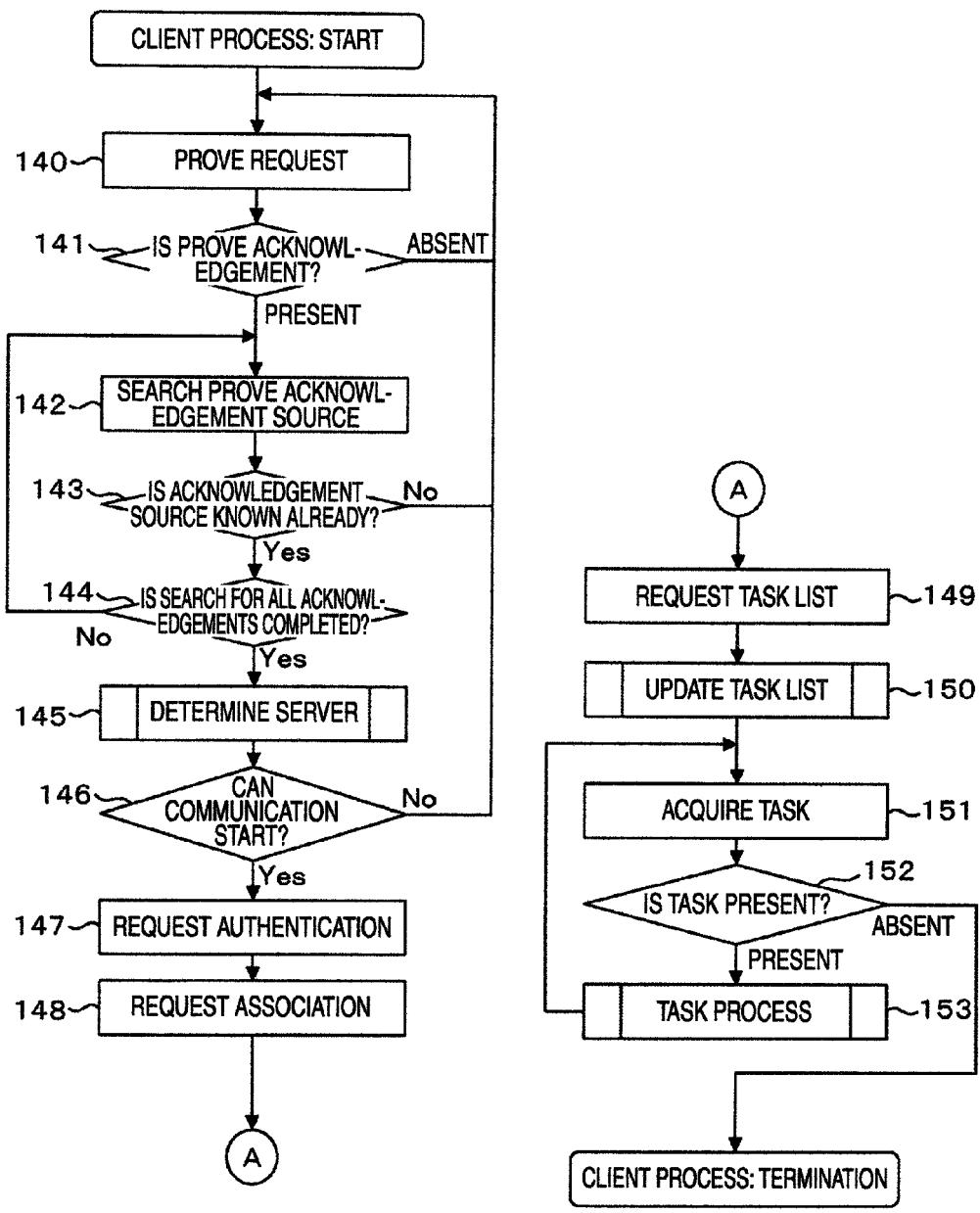
FIG. 6 is a flowchart of a client processing unit in the wireless data transport apparatus in the first embodiment of the invention.

FIG. 6 is a flowchart showing an operation of the client processing 36 in the wireless data transport apparatus in the first embodiment of the invention.

The client processing unit 36 has a function for communicating the data and control information in accordance with the contents written in the task list 35, after executing a predetermined connection process. The contents written in the task list 35 are configured so as to be able to change, so that it is possible to control the carrier terminal 30 desired by the log terminal 10 and management terminal 50.

Hereinafter, the operation of client processing unit 36 will be described with reference to FIG. 6. First, the client processing unit 36 notifies an issue of the prove request to the wireless communication unit 32, at a step 140.

The process determines a condition whether the prove acknowledgement from the wireless communication unit 32 is present or absent, at a step 141.

If the prove acknowledgement is not present, the process repeats the step 140. If the prove acknowledgement is present, a source of the prove acknowledgement is searched from the destination IP address 71 in the task list 35, at a step 142.

As a result of the search, the process determines whether the prove acknowledgement source is present in the destination IP address 71 in the task list 35, at a step 143.

If the prove acknowledgement source is not present in the destination IP address 71, the process at the step 140 repeats. If the prove acknowledgement source is present in the destination IP address 71 in the task list 35 (already known), the process further determines whether the search for all of the prove acknowledgement sources is completed, at a step 144.

If the search for the all of acknowledgements is not completed yet, the process at the step 142 repeats. If the search for the all of acknowledgements is completed, the client processing unit 36 notifies the all of prove acknowledgement sources detected to the server determination unit 33 to request a determination of whether the target is appropriate as a server, at a step 145.

Here, the server means the log terminal 10 and management terminal 50. A detail of the server determination will be described later.

The client processing unit 36 acknowledges an appropriate server as a communication destination from the server determination unit 33 to then determine whether the server can start a communication, at a step 146.

If a communicable server is not present, the process at the step 140 repeats. If the communicable server is present, the client processing unit 36 issues the authentication request to the wireless communication unit 32, at a step 147.

Subsequently, the client processing 36 issues the association request to the wireless communication unit 32, at a step 148.

At this point, a communication preparation is set up with the server. Subsequently, the client processing unit 36 notifies to the wireless communication unit 32 so as to request the task list to the server on the association at the present, at a step 149.

The task list I/O unit 34 receives a request so as to update the task list 35 with use of the acquired task list, at a step 150. A detail of the process at the step 150 will be described later.

Thereafter, the task having the highest priority is acquired from among the tasks having the IP address as destination IP address 71 of the server on the association at the present, from the task list 35, at a step 151.

If the task is cannot be acquired, the process in client processing unit 36 is terminated, at a step 152.

If the task is acquired, the process executes with the contents described in FIG. 5, at a step 153, and the process at the step 151 repeats.

Figure 7:
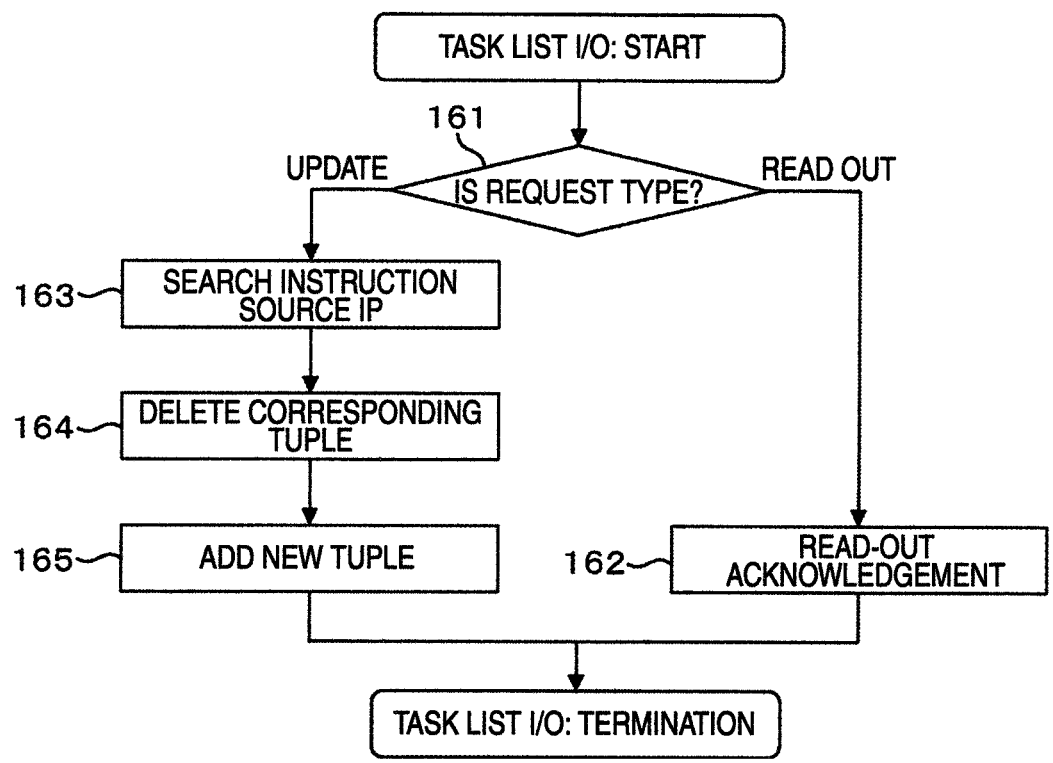
FIG. 7 is a flowchart of a task list I/O unit in the wireless data transport apparatus in the first embodiment of the invention.

FIG. 7 is a flowchart showing an operation of the task list I/O unit 34 in the wireless data transport apparatus in the first embodiment of the invention.

Hereinafter, the operation of task list I/O unit 34 will be described with reference to FIG. 7. The task list I/O unit 34 determines a type of access request from the client processing unit 36, at a step 161. If the type is a read-out request, a tuple having the request is read out from the task list 35 to then send an acknowledgement, at a step 162, and the process of task list I/O unit 34 is terminated.

If the type is a task list update request, the tuple having the instruction source IP address 72 consistent with the IP address of the server for the updating the task list, is searched, at a step 163.

If the corresponding tuple is present, the tuple is deleted from the task list 35, at a step 164.

Thereafter, the task received so as to update the request is added to the task list 35, at a step 165, and the process of task list I/O unit 34 is terminated.

According to the above-mentioned process, the server requesting the task can request the latest task without recourse to the past requested task.

In this embodiment of the invention, for example, the management terminal 50 requests the same task to the plurality of carrier terminals 30, and it can employ that a using method of expecting that any one of the carrier terminals 30 transports effective data. Further, there is a possibility that the past task becomes unnecessary at a certain time point since a time difference between a time point of requesting the task and that of acquiring a result is also large. In that case, it is possible to communicate the data effectively by the function of initializing the task, even though it is configured that the time difference from the request to the result becomes large.

Further, the task list to be updated is not only entered into the client processing unit 36 via the wireless communication unit 32. The client processing unit 36 receives the task list to be updated via other communication means (not shown), such as Ethernet, EIA-232, etc., thereafter, the task list update request may be issued to the task I/O unit 34. In this case, it is possible to execute a maintenance management of the task list from an outside terminal via a wired net work, such as Ethernet etc. for example.

Figure 8:
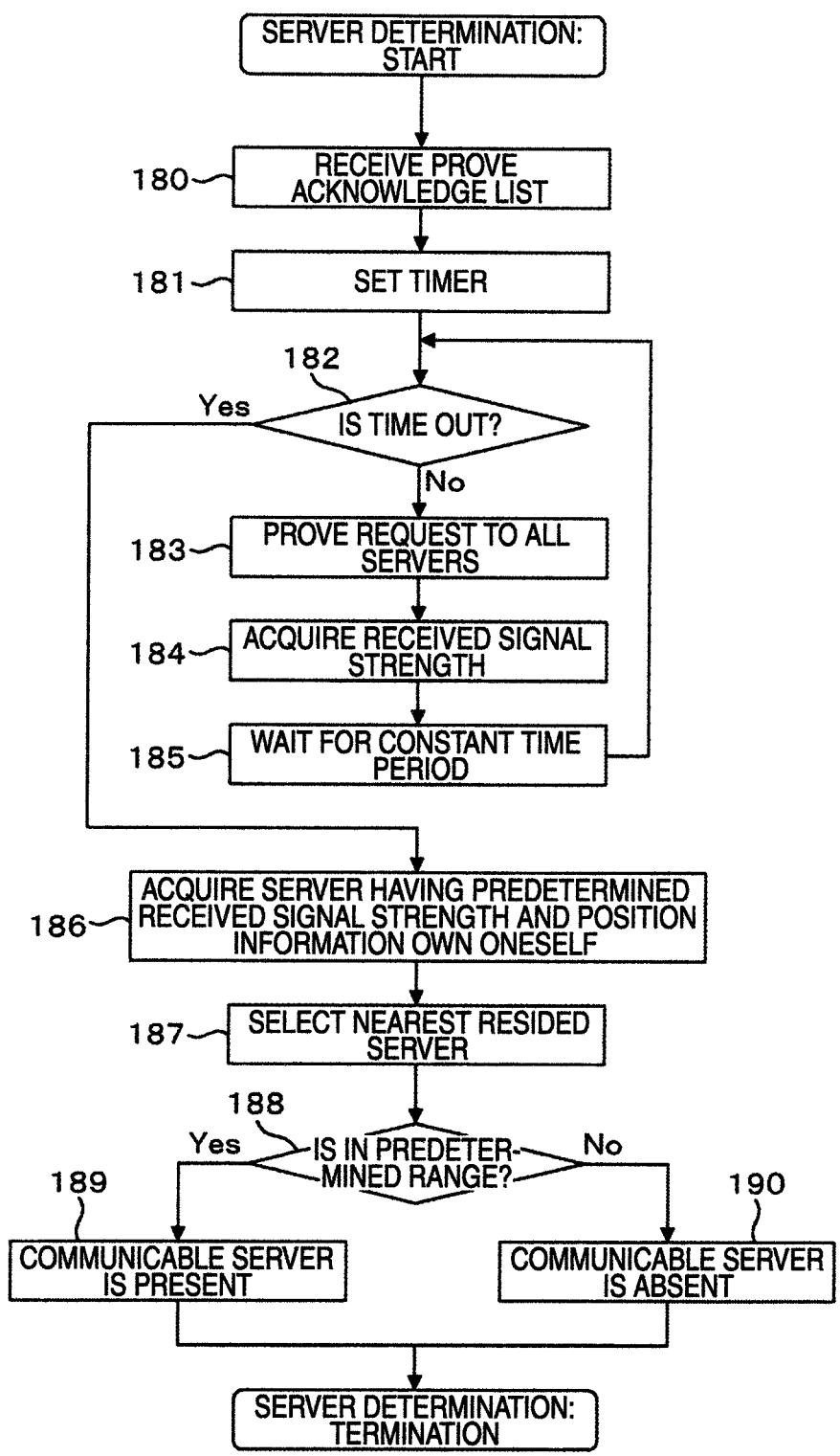
FIG. 8 is a flowchart of a server determination unit in the wireless data transport apparatus in the first embodiment of the invention.

FIG. 8 is a flowchart showing an operation of the server determination unit 33 in the wireless data transport apparatus in the first embodiment of the invention.

A purpose of the server determination unit 33 is that a predetermined received signal strength is maintained for a predetermined time interval and the wireless communication apparatus resided around is selected so that the communication partner is determined automatically. An operation of the server determination unit 33 will be described with reference to FIG. 8.

The server determination unit 33 receives the list of wireless communication devices (hereinafter, referred to as server) acknowledged to the prove request from the client processing unit 36, at a step 180.

Subsequently, a time for a determination time period for selecting the server to be a target is set in the timer 39, at a step 181.

The server determination unit 33 determines whether the timer 39 is time out, at a step 182.

If it is not time out, the prove request is issued for measuring the received signal strength to the server detected at the step 180, at a step 183.

The received signal strength is acquired for each of the servers replied the prove acknowledgement, at a step 184.

The signal strength of wireless carrier frequency may be acquired as the received signal strength by a dedicated circuit, however, a RSSI (Received Signal Strength Indicator) output from the wireless communication unit 32 may also be used. The acquired received signal strength is stored in correspondence with the server replied the prove acknowledgement. Thereafter, a constant time period is elapsed, at a step 185, and the process at the step 182 is repeated.

A purpose of this case is that the carrier terminal 30 detects that it stays by the log terminal 10 and management terminal 50 to be a target, by confirming that there is the predetermined received signal strength for the predetermined time interval, but the server resided around in a travel during which the carrier terminal 30 possibly detects it on the move is not a communication target.

Consequently, a value set in the timer 39 may be three second, for example, and a waiting time period at the step 185 may be one second.

At the step 182, when the timer 39 is time out, position information of the plural servers in which the server's received signal strength acquired at the step 184 exceeds a predetermined threshold value, is acquired from the destination position 75 in the task list 35, and the position of own oneself is also acquired from the positioning unit 40, at a step 186.

The nearest server to the own position is calculated and selected from the plurality of servers, at a step 187.

The process determines whether the selected result is present in a predetermined range, at a step 188.

It may be considered to determine a detected error of the positioning unit, such as GPS, for example, when determining the threshold value in the range. As a result of the process at the step 188, if the server is present in the predetermined range, an identifier of the server together with a message "communicable server is present" is notified to the client processing unit 36, at a step 189. If the server is not present in the predetermined range, a message "communicable server is absent" is notified to the client processing unit 36, at a step 190.

In addition, the invention is effective even if there is no the positioning unit 40. In this case, the process at the steps 186 to 188 is unnecessary in the above-mentioned flowchart. Alternatively, the received signal strength is only used for selecting the communicable server. When the received signal strength is lower than the predetermined threshold value, the message "communicable server is absent" is notified to the client processing unit 36 even if the strongest received signal strength is received from among the servers. When the received signal strength is higher than the predetermined threshold value, the server having the strongest received signal strength is notified to the client processing unit 36 together with the message "communicable server is present".

Figure 9:
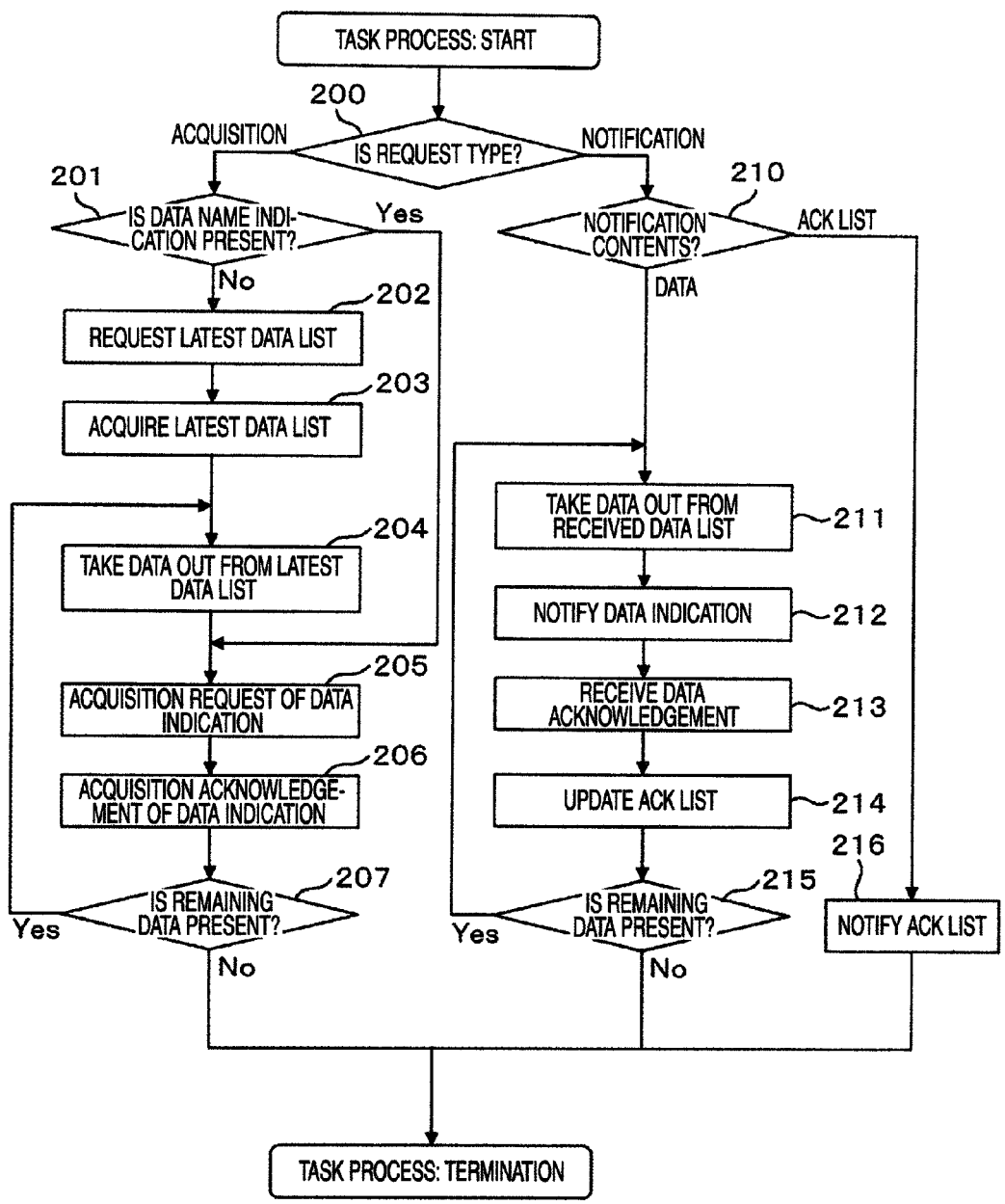
FIG. 9 is a flowchart of a task processing unit of the client processing unit in the wireless data transport apparatus in the first embodiment of the invention.

FIG. 9 is a flowchart showing an operation of the task processing unit 38 in the client processing unit 36 of the wireless data transport apparatus 30 in the first embodiment of the invention.

Hereinafter, the operation of the task processing unit 38 will be described with reference to FIG. 9.

The task processing unit 38 processes the contents of task list in response to an instruction from the client processing 36. Consequently, the task processing unit 38 determines a request type of the instructed task, at a step 200.

If the request type of task is an "acquisition", the process determines whether an indication for a data name is present, at a step 201.

The indication of data name is contents indicated to the argument 74 in the task list 35. If the indication of data name is not present and a request for "latest data" is present, the process branches to a step 202. If the indication of data name is present, the process branches to a step 205.

The task processing unit 38 requests the list of the latest data to the communication partner (for example, log terminal 10) if the indicated task is for an acquisition request of the latest data, at the step 202.

The log terminal 10 makes a list of data etc. not transmitted yet, and responds to the request. In consequence, the task processing unit 38 acquires the latest data list, at a step 203.

The task processing unit 38 selects a piece of data from the data list, at a step 204.

Thereafter, the task processing unit 38 indicates the selected data to issue the acquisition request to the log terminal 10, at the step 205.

The log terminal 10 replies the indicated data. The task processing unit 38 adds a received data name to the received data list (not shown) to then store the received data in the buffer 37 and issue the acknowledgement, at a step 206.

Thereafter, the process determines whether data not acquired is present in the latest data list, at a step 207.

If there is no remained data, the process is terminated. If there is remained data, the process at the step 204 is repeated.

In contrast, if the request type of task is a "notification" at the step 200, the process executes a determination for the contents to be notified, at a step 210.

If the notification contents is "ACK list" in the task list 35, the ACK list is notified to the communication partner (for example, log terminal 10), and the process is then terminated.

If the notification contents are "data", the data is extracted from the received data list created at the step 206, at a step 211.

The process notifies the extracted data to the communication partner (for example, management terminal 50), at a step 212.

The management terminal 50 receives the data to then issue the acknowledgement. Consequently, the task processing unit 38 receives the acknowledgement, at a step 213.

The task processing unit 38 adds the data name to the ACK list to update the list, as acquired the acknowledgement of the corresponding data, at a step 214.

Here, the ACK list means a list of the data name corresponding to the communication partner. The data written in the list is data received the acknowledgement by the carrier terminal 30, that is, data delivered to the final destination.

Thereafter, the task processing unit 38 determines whether the data not notified is remained in the received data list, at a step 215. If the remained data is present, the process repeats from the step 211, and the process terminates if the remained data is absent.

Figure 10:
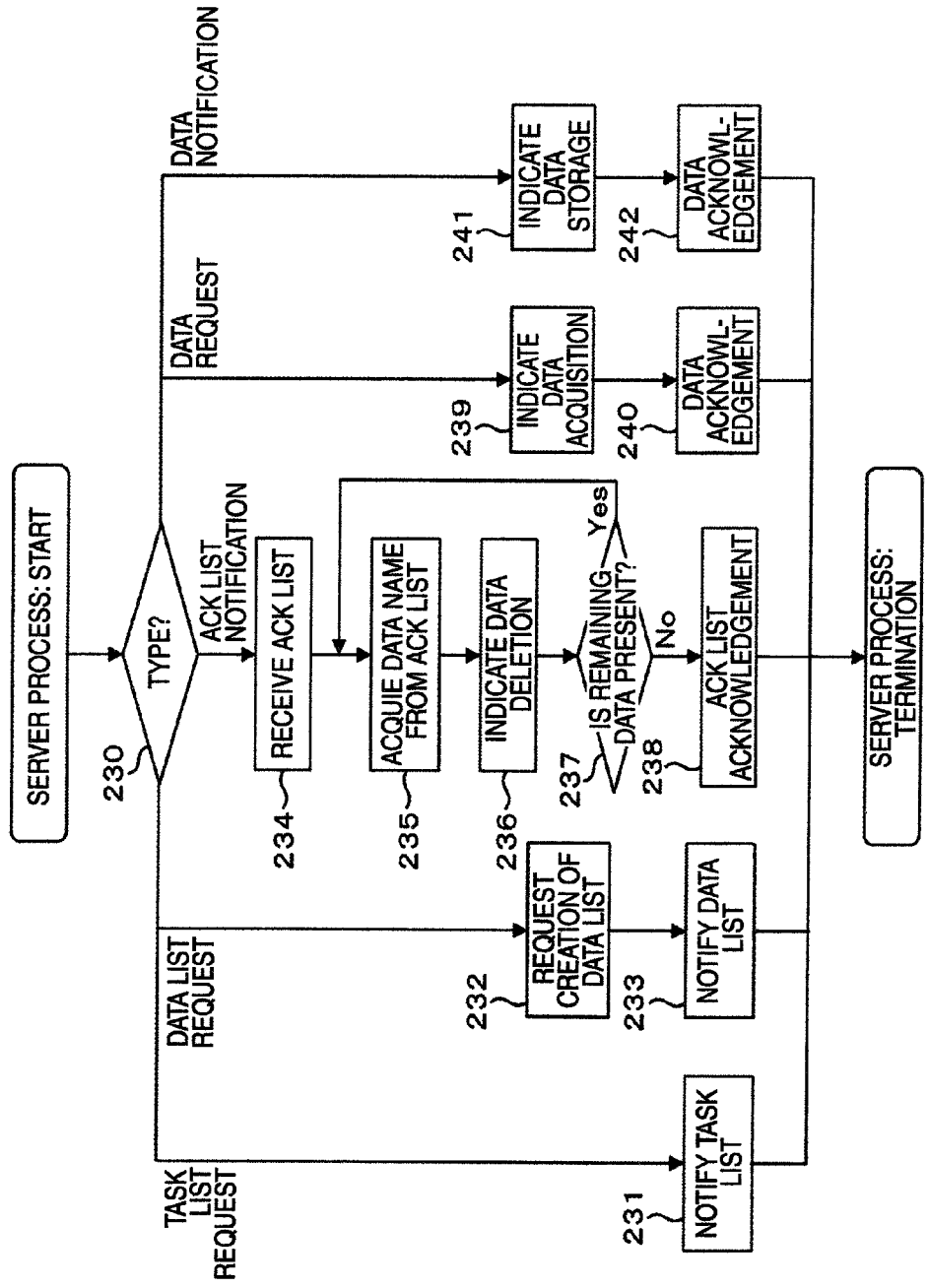
FIG. 10 is a flowchart of a server processing unit in the wireless communication apparatus in the first embodiment of the invention.

FIG. 10 is a flowchart showing an operation of the server processing unit 13 in the wireless communication apparatuses 10, 50 in the first embodiment of the invention.

The server processing unit 13 executes a data I/O and data management in response to a processing request in relation to the various processing requests, such as the task list request, ACK list notification, etc. from the carrier terminal 30. The log terminal 10 and management terminal 50 have the server processing unit 13, which may be the same configuration for the both terminals.

Hereinafter, the operation of the server processing unit 13 will be described with reference to FIG. 10.

The server processing unit 13 determines the type of processing request notified via the wireless communication unit 12, at a step 230.

If the processing request is the task list, the server processing unit 13 selects the task corresponding to the carrier terminal 30 from the task list 14 to then execute a notification, at a step 231, and the process is terminated.

The task list 14 may be a statement used for a fixed process in advance. Further, the flow control unit 20 in the log terminal 10 executes the data communications, however, the task indicated with the data name, for example, the task such as the tuple 82 in FIG. 5 may be added to the task list 14 to be retransmitted, in relation to the data not received the ACK. Likewise, when the flow control unit 20 in the management terminal 50 detects the data, sequence number of which is dropped, and the data for which the data reception is not executed even if a certain period of time is elapsed, a retransmission request of the data may be added to the task list 14.

If the processing request is the data list request at the step 230, the server processing unit 13 requests a creation of the data list to the buffer management unit 16, and the buffer management 16 thereby creates the data list, at a step 232.

Thereafter, the server processing unit 13 receives the data list from the buffer management unit 16 to notify it to the terminal (for example, carrier terminal 30) from which the data list request issued, at a step 233, and the process is then terminated.

Here, the data stored in the buffer 17 may simply be listed for the creation of data list. Further, the data list may be prepared so as to transmit the data in plural times for every data so that a delivering probability of the data is raised. For a purpose of transmitting the data in the plural times, a counter (not shown) is prepared on the buffer management unit 16, for counting every data so as to detect the number of transmission times. The buffer management unit 16 refers to the counter to search the data for which predetermined number of transmission times is not reached, to then create the data list.

If the processing request is the ACK list notification at the step 230, the server processing unit 13 receives the ACK list, at a step 234.

Thereafter, the server processing unit 13 acquires the data name from the received ACK list, at a step 235.

The server processing unit 13 notifies the acquired data name to the buffer management unit 16 to instruct a data deletion, and the buffer management unit 16 deletes the data, at a step 236.

The server processing unit 13 determines whether the remaining data, which is not instructed the deletion to the ACK list, is present, at a step 237.

If the remaining data is present, the process repeats from the step 235. If the remaining data is absent, a completion of receiving and processing the ACK list acknowledges to the terminal (for example, carrier terminal 30) from which the ACK list notification has been issued, at a step 238, and the process is then terminated.

If the processing request is a data request indicated with the data name at the step 230, the server processing unit 13 instructs the data acquisition together with the data name to the buffer management unit 16, at a step 239.

The server processing unit 13 acknowledges the acquired data to the data request source, at a step 240, and the process is terminated.

If the processing request is the data notification at the step 230, the server processing unit 13 receives the data to instruct the buffer management unit 16 so as to store the data, at a step 241.

Thereafter, the server processing unit 13 issues the acknowledgement of the data notification to the data notification source, at a step 242, and the process is terminated.

In addition, a part of the process in the server processing unit 13 may be degenerated by fixing the role of terminals and the processing contents.

For example, by fixing the function of the respective terminals in the wireless apparatus, the task list process can be removed. In this case, the task list request and acknowledgement can be removed from the process sequence in FIG. 3 and FIG. 4. Besides, the step 231 is removed from the flowchart, when determined as the task list request at the step 230, in the server processing unit 13, therefore, it is unnecessary to determine the task list request.

Figure 11:
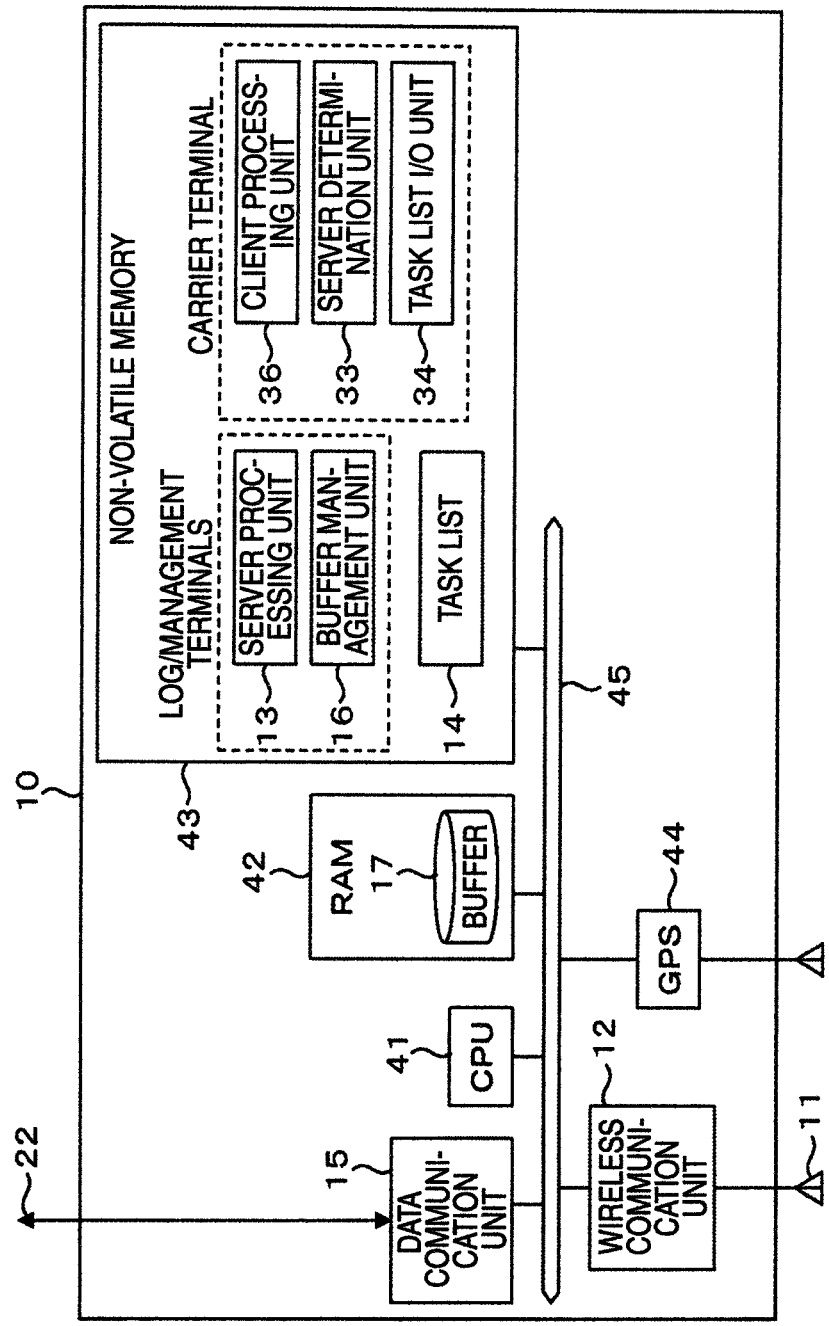
FIG. 11 is a diagram showing one configuration example of the wireless communication apparatus in the first embodiment of the invention.

FIG. 11 shows an example of the wireless communication apparatus in the first embodiment of the invention.

The wireless communication apparatuses 10, 50 and wireless data transport apparatus 30 can be realized by the same configuration. In this embodiment, the configuration of wireless communication apparatus 10 will be described below, as an example. In addition, a part of detailed configuration will also be described since it is illustrated in FIG. 11 to realize the function in the wireless data transport apparatus 30.

The wireless communication apparatus 10 has elements including a CPU 41, a RAM 42, a non-volatile memory 43, a GPS 44, an internal bus 45, the data communication unit 15, the wireless communication unit 12, the antenna 11, etc.

These elements are coupled with each other by the internal bus 45 to exchange data one another. The internal bus 45 is a bus providing a capability and function for coupling these elements, for example, can be used of an asynchronous memory bus, a PCI (Peripheral Component Interconnect) bus, a PCI Express, etc.

The CPU 41 reads out instructions and constants of a computer program stored in the non-volatile memory 43, for executing the server processing unit 13, buffer management unit 16, task list 14, etc., stores the instructions and constants in the RAM 42 as required, reads out and written them therein, and executes a software processing. The non-volatile memory 43 includes an electrically deleted and writable EEPROM and flush memory, and an optical magnetic media, such as hard disk device, CD-ROM, etc.

The buffer 17 is secured in the RAM 42 as required. The task list 14 may be stored in the non-volatile memory 43 when storing it fixedly, and it may also be secured in the RAM 42 when updating it after starting the wireless apparatus.

The wireless communication unit 12 may be made into an independent module configuration itself to be connected to the internal bus 45. Either the wireless communication unit 12 may be connected directly to the internal bus 45 or it may be connected through a bridge part (not shown) to be connected with the internal bus 45 one another.

For example, when the wireless communication unit 12 has an interface corresponding to a USB and the internal bus 45 is of the PCI bus, it may be better connected by using a PCI-USB bridge LSI (not shown). Likewise, when the wireless communication unit 12 has the interface specified by a PC card and the internal bus 45 is of the PCI bus, it may be better connected by using a PCI-PC card bridge LSI (not shown). Further, when the wireless communication unit 12 has the interface corresponding to the Ethernet (registered trademark) and the internal bus 45 is of the PCI bus, it may be better connected via a LAN control LSI (not shown). In this case, the wireless communication unit 12 and antenna 11 are separated off from the wireless communication apparatus 10 to then be able to install them by using an Ethernet cable.

The data communication unit 15 notifies communicated data received from the communication path 22 to the CPU 41 and also transmits data requested from the CPU 41 to the communication path 22 via the internal bus 45. Here, in the case where it is considered to use the Ethernet for the communication path 22, it is preferable to employ the LAN control LSI, as data communication unit 15, having the interface with the internal bus.

The data communication unit 12 notifies an occurrence of own conditional variation and processing request to the CPU 41 with an interrupt signal (not shown) applied thereto. The CPU 41 executes the above-mentioned software to perform an interrupt process from the data communication unit 15 and realize the function to be an object.

In addition, the non-volatile memory 43 in FIG. 11 shows functions used for the log/management terminal and for the carrier terminal enclosed by a dotted line. They may be mounted exclusively or simultaneously. The CPU 41 may recognize own roles (log terminal, management terminal and carrier terminal) as a device, and operate the appropriate functions so as to be made effectively, when mounting simultaneously.

According to the invention, when the carrier terminal 30 moves back and forth between the log terminal 10 and management terminal 50, it is possible that the creation and deletion of data are managed appropriately by transporting the data one another and also transporting the delivery confirmation of data one another.

Even when it is advanced that the data is bulked, it is possible to execute acquiring the data in an appropriate cost. Further, it is also possible to delete the original data after confirming the delivery, so that the reliability is improved. Furthermore, the data from which the delivery confirmation cannot be received, can be retransmitted autonomously or can request the retransmission, so that the reliability is also improved.

Second Embodiment

Figure 12:
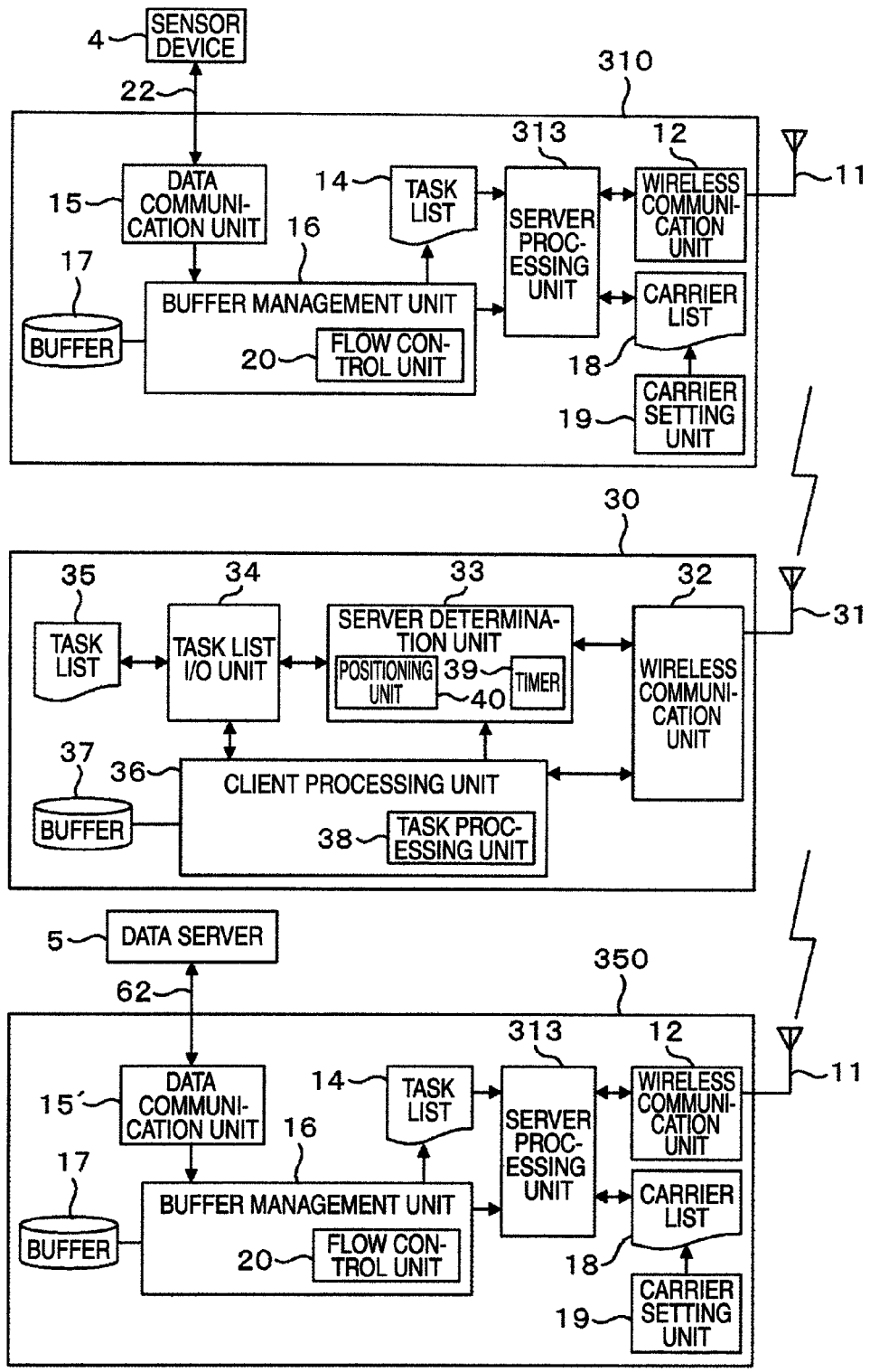
FIG. 12 is an outline diagram showing a communication system applied with the wireless data transport apparatus in a second embodiment of the invention.

FIG. 12 shows an outline of the communication system applied to the wireless data transport apparatus in a second embodiment of the invention.

Elements etc. used in the second embodiment having the same reference numeral in the first embodiment have the same function unless otherwise specified.

In comparison with the first embodiment, the communication system in this embodiment is different in the configuration of wireless communication apparatuses 310, 350. The wireless communication apparatuses 310, 350 in this embodiment have additionally a carrier list 18 and a carrier setting unit 19, and the process in a server processing unit 313 is therefore changed, compared with the server processing unit 13. The server processing unit 313 has additionally a function for selecting in priority the carrier terminal contained in the carrier list 18.

In the following description conveniently, the wireless communication apparatus 310 is referred to as a log terminal 310, and the wireless communication apparatus 350 is referred to as a management terminal 350.

For example, it is assumed that a manager, who operates the management terminal 350, understands from a traveling plan in advance in which of the dump trucks 2 transports the data effectively. In this case, the carrier setting unit 19 in the management terminal 350 creates a list of the carrier terminal 30 mounted on the dump truck 2, which can transport the data effectively, to then set in the carrier list 18.

The carrier terminal 30 receives the carrier list 18 from the management terminal 350 to thereby deliver to the log terminal 310. In consequence, the carrier list 18 can be made synchronized between the management terminal 350 and log terminal 310.

The log terminal 310 is configured so as to transmit the data only to the carrier terminal 30 written in the carrier list 18. The data is transmitted in priority to the carrier terminal 30 to be moved back and forth in high frequency, therefore, it is disappeared that the carrier terminal 30 moved back and forth in low frequency continues keeping the control information, such as data and ACK. In consequence, the data loss becomes little between the log terminal 310 and management terminal 350, so that the data can be delivered effectively.

In addition, this embodiment can be realized by the carrier terminal 30 configured of the same in the first embodiment.

Figure 13:
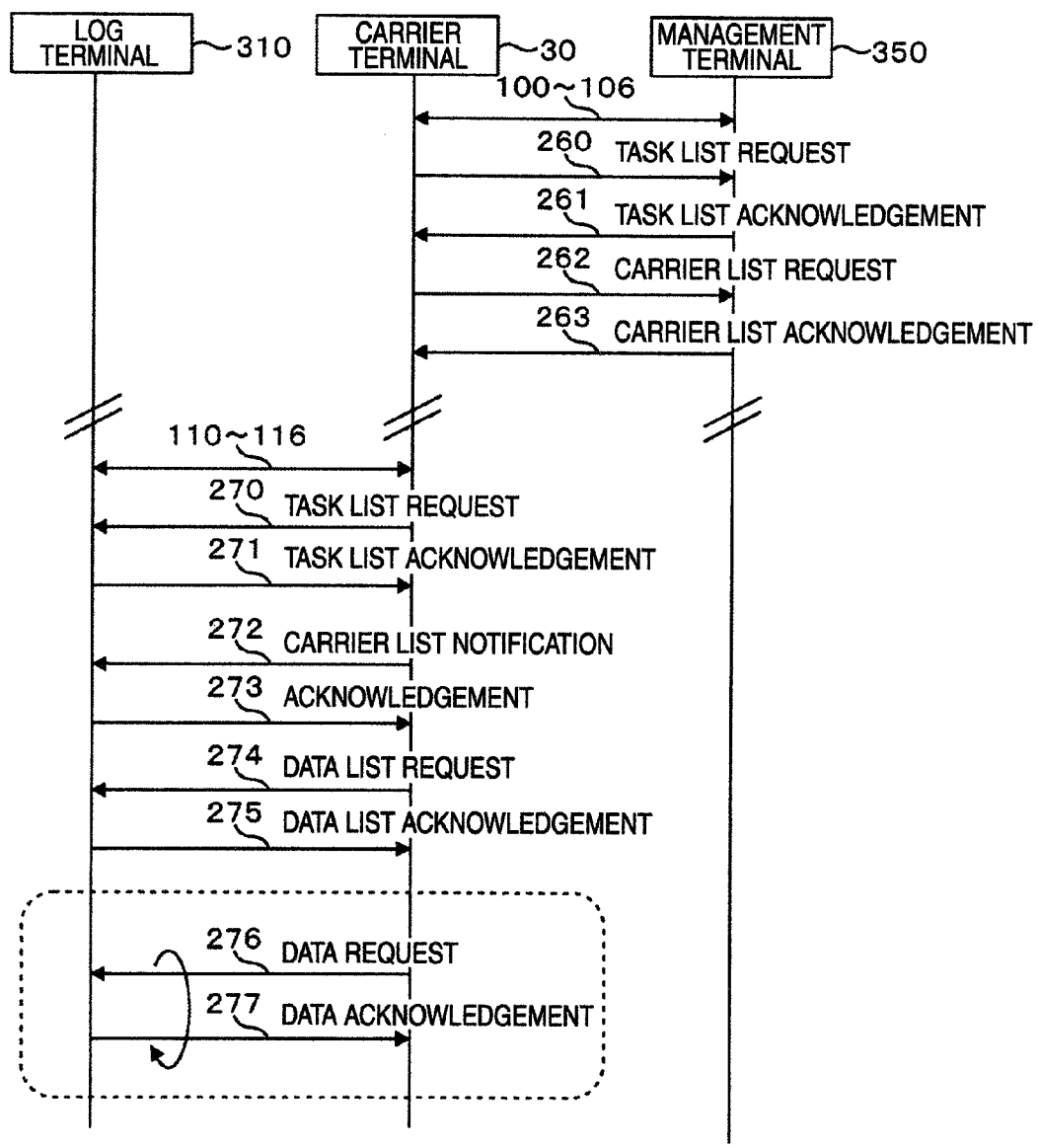
FIG. 13 is a sequence diagram for communicating the data and control information between the wireless apparatuses in the second embodiment of the invention.

FIG. 13 is a part of an operation sequence to communicate the data and control information between the wireless apparatuses in the second embodiment of the invention or shows a sequence diagram to communicate the data and control information.

Hereinafter, an operation using the carrier list 18 will be described with reference to FIG. 13.

First, the carrier terminal 30 issues the prove request by the time of finding a communication partner. At this time, the carrier terminal 30 refers to the task list 35 in response to the apparatus resided in the communicable area to then execute the process written in it. The following description will be concerned with an example where the carrier terminal 30 moves in the communicable area of management terminal 350, in this embodiment.

After the carrier terminal 30 moves in the communicable area of management terminal 350, both the carrier terminal 30 and management terminal 350 execute the connection process like in FIG. 3, at processes 100 to 106.

The carrier terminal 30 acquired an association acknowledgement issues the task list request to the management terminal 350, at process 260. The management terminal 350 appends the task for outputting the received data to the task list to then acknowledge to the carrier terminal 30, at a process 261.

The carrier terminal 30 received the task list requests a carrier list in response to a newly added task indicating "acquire carrier list" in the task list, at a process 262. The management terminal 350 acknowledges the information of carrier list 18 to the carrier terminal 30, at a process 263.

Thereafter, it is assumed that the dump truck 2 mounting the carrier terminal 30 travels to then move into the communicable area of the log terminal 310. The carrier terminal 30 recognizes the log terminal 310 to execute the connection process so that the process written in the task list is executed, at processes 110 to 116.

After setting up the association, the carrier terminal 30 issues the task list request to the log terminal 310 so that the terminal knows the process to be executed, at a process 270.

The log terminal 310 selects the task list corresponding to the carrier terminal 30 to issue a task list acknowledgement to the carrier terminal 30, at a process 271.

Thereafter, the carrier terminal 30 notifies the carrier list 18 to the log terminal 310 in response to the task list set by the management terminal 350, at a process 272.

The log terminal 310 confirms the reception of carrier list 18 to notify the acknowledgement, at a process 273.

The carrier terminal 30 requests the data list to the log terminal 310 so as to acquire the data, at a process 274.

Here, the log terminal 310 refers to the carrier list 18 provided in own oneself to change the operation. That is, a normal data list is acknowledged if the request is from the carrier terminal 30 "permitted to transmit the data" written in the carrier list 18.

In contrast, an empty data list is acknowledged if the request is from the carrier terminal 30 "not permitted to transmit the data" unwritten in the carrier list 18, at a process 275.

The carrier terminal 30 permitted to transmit the data continues requesting the data afterward, at a process 276, and acquires its acknowledgement from the log terminal 310, at a process 277.

In contrast, the carrier terminal 30 not permitted to transfer the data receives the empty data list. At this time point, the process is completed.

As mentioned above, it is possible to control whether the data is transmitted to the carrier terminal 30 by using the carrier list 18. In consequence, the data is transmitted only to the carrier terminal 30 scheduled by the management terminal 350, so that a delivery interval of the data can be made dense.

Figure 14:
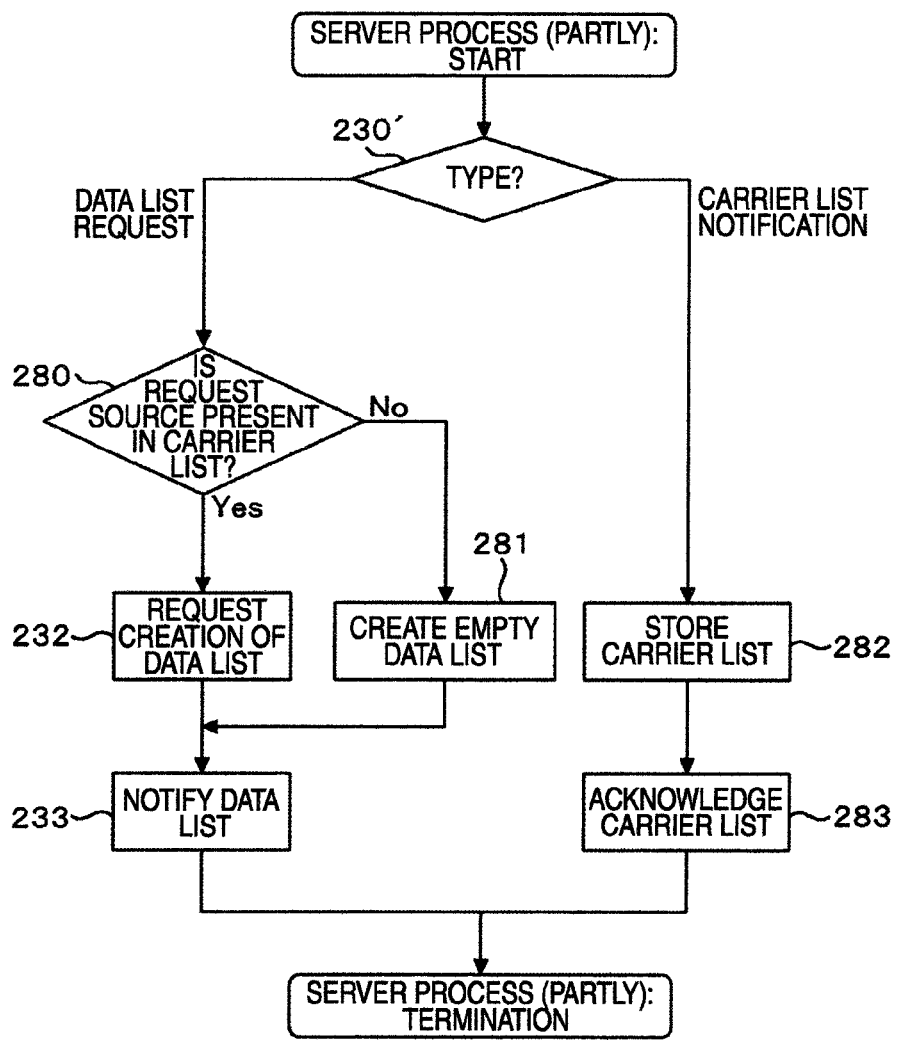
FIG. 14 is a flowchart of a part of the server processing unit in the wireless communication apparatus in the second embodiment of the invention.

FIG. 14 is a flowchart showing an operation of the server processing unit 313 in the wireless communication apparatus in the second embodiment of the invention.

In order to realize the invention, the process contents from the data list request are changed in the server process in FIG. 10, and the process of carrier list notification is added thereto. Other server process is the same as that in FIG. 10, which is omitted from FIG. 14.

Hereinafter, an operation of changing and adding functions will be described with reference to FIG. 14.

The server processing unit 313 determines the type of process request to be notified via the wireless communication unit 12, at a step 230'.

If the process request is of the data list request, the server processing unit 313 determines, by using the carrier list 18, whether a request source is the terminal written in the carrier list 18, at a step 280.

If the process request is of a request from the terminal written in the carrier list 18, the server processing unit 313 requests a data list creation to the buffer management unit 16, and the buffer management unit 16 creates the data list, at a step 232.

In contrast, if the process at the step 280 determines as a request from the terminal unwritten in the carrier list 18, the server processing unit 313 creates the empty data list, at a step 281.

Thereafter, the server processing unit 313 notifies the data list to the terminal (for example, carrier terminal 30) from which the data list request is issued, at a step 233, and the server processing is then terminated.

Further, if the process request at the step 230' is the carrier list notification, the server processing unit 313 stores the carrier list 18, at a step 282.

Thereafter, the server processing unit 313 issues a carrier list acknowledgement to the terminal from which the carrier list 18 is notified, at a step 283, and the server processing is terminated.

FIG. 15 shows a configuration example of the task list 35 in the wireless data transport apparatus in the second embodiment of the invention.

FIG. 15 shows the tuple 84 to be added from the management terminal 350, other than the task list shown in FIG. 5, in order to realize this embodiment. The task in the tuple 84 has a higher priority than that of the tuple 83 for acquiring the latest data so that it requires to execute in high priority, therefore, the priority 70 is set to "15". The argument 74 and task 73 are configured such that the "carrier list" is "notified" thereto.

As described above, the carrier list 18 and carrier list setting unit 19 are added respectively to the wireless communication apparatuses 310, 350 to then be configured as the server processing unit 313 and task list 14. In consequence, the carrier terminal 30 having the high frequency for the back and forth travel is indicated to be able to realize the data transport.

The invention relates to the apparatus and communication system for transporting the bulk data automatically, particularly, is applicable to the communication apparatus or communication system for intermediating the transport of the bulk data and acknowledgement between the plurality of fixed stations by the mobile station, via the fixed station and wireless communication.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system that executes a data communication between a plurality of wireless communication apparatuses via a wireless relay transport apparatus, the wireless relay transport apparatus, comprising:
 a client wireless communication unit that executes a transmission and reception of data to and from the plurality of wireless communication apparatuses via a wireless communication;
 a server determination unit that selects a communication target from among the plurality of wireless communication apparatuses;
 a client task list to be written with the plurality of wireless communication apparatuses to be the communication target and process contents to be communicated; and
 a client processing unit that executes an indication of the communication target in accordance with the client task list to execute a communication of the data and a data acknowledgement, wherein
 the server determination unit has a timer and selects the wireless communication apparatus communicable for a predetermined time interval in a predetermined wireless received signal strength.

2. The apparatus according to claim 1 wherein
 the server determination unit provides a positioning unit that outputs position information of the wireless relay transport apparatus itself,
 the client task list provides the position information of the wireless communication apparatus, and
 the server determination unit selects the wireless communication apparatus resided in a nearest position from the wireless relay transport apparatus itself from among the wireless communication apparatuses communicable for the predetermined time interval in the predetermined wireless received signal strength.

3. The apparatus according to claim 2 wherein
 the wireless relay transport apparatus further comprises a task list I/O unit to receive an input task list written with a task to be updated from an outside terminal, the task list I/O unit has a function that determines the outside terminal that receives the input task list and updates a part of the task list by using the input task list, and the client processing unit updates the input task list via the task list I/O unit.

4. The apparatus according to claim 1 wherein the wireless relay transport apparatus further comprises a task list I/O unit to receive an input task list written with a task to be updated, from an outside terminal, the task list I/O unit has a function that determines the outside terminal that inputs the input task list and updates a part of the task list by using the input task list, and the client processing unit updates the input task list via the task list I/O unit.

5. A wireless communication apparatus that executes a data communication between a plurality of wireless communication apparatuses via a wireless relay transport apparatus, comprising:

a server wireless communication unit that executes a transmission and reception of data from a plurality of wireless relay transport apparatuses via a wireless communication;

a server processing unit that executes a process in accordance with a request from the plurality of wireless relay transport apparatuses; and a server task list to be written with the plurality of wireless communication apparatuses and process contents to be communicated, wherein the server processing unit receives the data and outputs a data acknowledgement corresponding to the data from and to the wireless relay transport apparatuses to receive and output the server task list.

6. A wireless communication system that executes a data communication between a plurality of wireless communication apparatuses via a wireless relay transport apparatus wherein the wireless communication system is configured by at least two wireless communication apparatuses and at least one wireless relay transport apparatus, the wireless relay transport apparatus comprises:

a client wireless communication unit that executes a transmission and reception of data to and from the wireless communication apparatus via a wireless communication;

a server determination unit that selects a communication target from among the plurality of wireless communication apparatuses;

a client task list to be written with the plurality of wireless communication apparatuses and process contents to be communicated; and a client processing unit that executes an indication of a communication target in accordance with the written client task list to execute a communication of the data and a data acknowledgement, wherein the server determination unit has a timer and selects the wireless communication apparatus communicable for a predetermined time interval in a predetermined wireless received signal strength, the wireless communication apparatus comprises:

a server wireless communication unit that executes the transmission and reception of the data to and from a plurality of wireless relay transport apparatuses via the wireless communication;

a server processing unit that executes a process in accordance with a request from the plurality of wireless relay transport apparatuses; and a server task list to be written with the plurality of wireless communication apparatuses and process contents to be communicated, wherein the server processing unit receives the data and outputs a data acknowledgement corresponding to the data from and to the wireless relay transport apparatuses to receive and output the server task list.

7. The system according to claim 6 wherein the wireless relay transport apparatus has a task list I/O unit to receive an input task list written with a task to be updated from an outside terminal, the task list I/O unit has a function that determines the outside terminal that receives the input task list to update a part of the client task list by using the input task list, and the client processing unit updates the client task list via the task list I/O unit.

8. The system according to claim 7 wherein the wireless communication apparatus has a data communication unit, a buffer management unit and a server buffer, the data communication unit has an interface that executes to receive and output the data from and to outside terminals of the wireless communication apparatus, the server buffer stores the data to be received and outputted from and to the data communication unit, the buffer management unit has a flow control unit, and the flow control unit provides a function that manages a breakout and a loss of the data stored in the server buffer and a function that adds a task for retransmitting lost data to the server task list when detecting the data loss.

9. The system according to claim 7 wherein the wireless relay transport apparatus provides a client buffer, and the client processing unit transmits the data to the wireless communication apparatus to correspond a data acknowledgement from the wireless communication apparatus to the data, store in the client buffer as an acknowledgment list, and output the acknowledgement list to another wireless communication apparatus.

10. The system according to claim 6 wherein the wireless communication apparatus has a data communication unit, a buffer management unit and a server buffer, the data communication unit has an interface that executes to receive and output the data from and to outside terminals of the wireless communication apparatus, the server buffer stores the data to be received and outputted from and to the data communication unit, the buffer management unit has a flow control unit, and the flow control unit provides a function that manages a breakout and a loss of the data stored in the server buffer and a function that adds a task for retransmitting lost data to the server task list when detecting the data loss.

11. The system according to claim 10 wherein the wireless relay transport apparatus provides a client buffer, and the client processing unit transmits the data to the wireless communication apparatus to correspond a data acknowledgement from the wireless communication apparatus to the data, store in the client buffer as an acknowledgment list, and output the acknowledgement list to another wireless communication apparatus.

12. The system according to claim 6 wherein
the wireless relay transport apparatus provides a client buffer, and
the client processing unit transmits the data to the wireless communication apparatus to correspond a data acknowledgement from the wireless communication apparatus to the data, store in the client buffer as an acknowledgment list and output the acknowledgement list to another wireless communication apparatus.

13. A wireless communication system that executes a data communication between a plurality of wireless communication apparatuses via a wireless relay transport apparatus, comprising:
a server wireless communication unit that executes a transmission and a reception of data to and from a plurality of wireless relay transport apparatuses via a wireless communication;
a server processing unit that executes a process in accordance with a request from the plurality of wireless relay transport apparatuses;
a server task list written to be with the plurality of wireless communication apparatuses and process contents to be communicated; and
a carrier list written with the wireless relay transport apparatus to be used for a data transport, wherein
the server processing unit receives the data and outputs a data acknowledgement corresponding to the data from and to the wireless relay transport apparatuses to receive and output the server task list and to receive the carrier list, and
the server processing unit does not transmit the data for a data request from the wireless relay transport apparatus unwritten in the carrier list.

14. A wireless communication system that executes a data communication between a plurality of wireless communication apparatuses via a wireless relay transport apparatus, wherein
the wireless communication system is configured by at least two wireless communication apparatuses and at least one wireless relay transport apparatus,
the wireless relay transport apparatus comprises:
a client wireless communication unit that executes a transmission and reception of data to and from the wireless communication apparatus via a wireless communication;
a server determination unit that selects a communication target from among the plurality of wireless communication apparatuses;
a client task list to be written with the plurality of wireless communication apparatuses and process contents to be communicated; and
a client processing unit that executes an indication of the communication target in accordance with the written client task list to execute a communication of the data and a data acknowledgement,
the server determination unit has a timer and selects the wireless communication apparatus communicable for a predetermined time interval in a predetermined wireless received signal strength,
the wireless communication apparatus comprises:
a server wireless communication unit that executes the transmission and reception of the data to and from the plurality of wireless relay transport apparatuses via the wireless communication;
a server processing unit that executes a process in accordance with a request from the plurality of wireless relay transport apparatus;
a server task list to be written with the plurality of wireless communication apparatuses and process contents to be communicated; and
a carrier list written with the wireless relay transport apparatus to be used for a data transport, wherein
the server processing unit receives the data and outputs a data acknowledgement corresponding to the data from and to the wireless relay transport apparatuses to receive and output the server task list and to receive the carrier list, and
the server processing unit does not transmit the data for a data request from the wireless relay transport apparatus unwritten in the carrier list.

* * * * *